US012169232B2

(12) United States Patent
Ansari et al.

(10) Patent No.: US 12,169,232 B2
(45) Date of Patent: Dec. 17, 2024

(54) RADAR AND CAMERA DATA FUSION

(71) Applicant: QUALCOMM Incorporated, San Diego, CA (US)

(72) Inventors: Amin Ansari, San Diego, CA (US); Sundar Subramanian, San Diego, CA (US); Radhika Dilip Gowaikar, San Diego, CA (US); Ahmed Kamel Sadek, San Diego, CA (US); Makesh Pravin John Wilson, San Diego, CA (US); Volodimir Slobodyanyuk, San Diego, CA (US); Shantanu Chaisson Sanyal, San Diego, CA (US); Michael John Hamilton, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 714 days.

(21) Appl. No.: 17/316,223

(22) Filed: May 10, 2021

(65) Prior Publication Data

US 2022/0357441 A1 Nov. 10, 2022

(51) Int. Cl.
*G01S 13/86* (2006.01)
*G01S 13/89* (2006.01)
*G06N 20/00* (2019.01)
*G06T 7/11* (2017.01)
*G06T 7/521* (2017.01)

(52) U.S. Cl.
CPC .......... *G01S 13/867* (2013.01); *G01S 13/865* (2013.01); *G01S 13/89* (2013.01); *G06N 20/00* (2019.01); *G06T 7/11* (2017.01); *G06T 7/521* (2017.01); *G06T 2207/10028* (2013.01)

(58) Field of Classification Search
None
See application file for complete search history.

(56) References Cited

U.S. PATENT DOCUMENTS

| 2009/0292468 | A1  | 11/2009 | Wu et al. |
| 2021/0150203 | A1* | 5/2021  | Liu ........................ G06V 20/56 |
| 2021/0286068 | A1* | 9/2021  | Kumar .................... G01S 13/87 |

FOREIGN PATENT DOCUMENTS

DE 102019127283 4/2021

OTHER PUBLICATIONS

DE102019127283 translation (Year: 2019).*
(Continued)

*Primary Examiner* — Whitney Moore
(74) *Attorney, Agent, or Firm* — QUALCOMM Incorporated

(57) ABSTRACT

A device for processing image data is disclosed. The device can obtain a radar point cloud and one or more frames of camera data. The device can determine depth estimates of one or more pixels of the one or more frames of camera data. The device can generate a pseudo lidar point cloud using the depth estimates of the one or more pixels of the one or more frames of camera data, wherein the pseudo lidar point cloud comprises a three-dimensional representation of at least one frame of the one or more frames of camera data. The device can determine one or more object bounding boxes based on the radar point cloud and the pseudo lidar point cloud.

36 Claims, 8 Drawing Sheets

(56) References Cited

OTHER PUBLICATIONS

Dou J., et al., "SEG-VoxelNet for 3D Vehicle Detection from RGB and LiDAR Data", 2019 International Conference on Robotics and Automation (ICRA), IEEE, Palais Des Congres De Montreal, Montreal, Canada, May 20, 2019-May 24, 2019, May 20, 2019 (May 20, 2019), pp. 4362-4368, XP033593463, DOI: 10.1109/ICRA.2019.8793492 [retrieved on Aug. 9, 2019], abstract, figures 2, 4, p. 4364, right-hand column, lines 16-24, 28-30, p. 4365, left-hand column, lines 10-34, p. 4365, right-hand column, lines 1-5.

International Search Report and Written Opinion—PCT/US2022/071238—ISA/EPO—Jun. 20, 2022.

Jiao J., et al., "Look Deeper into Depth: Monocular Depth Estimation with Semantic Booster and Attention-Driven Loss", Oct. 7, 2018 (Oct. 7, 2018), Advances In Biometrics : International Conference, ICB 2007, Seoul, Korea, Aug. 27-29, 2007, Proceedings, [Lecture Notes in Computer Science, Lect.Notes Computer], Springer, Berlin, Heidelberg, pp. 55-71, XP047489079, ISBN: 978-3-540-74549-5 [retrieved on Oct. 7, 2018] abstract, figures 2, 3, p. 60, lines 1-7, 21-24, p. 61, lines 1-4, p. 64, lines 23-29.

Mathew A., et al., "Monocular Depth Estimation with SPN Loss", Image and Vision Computing, Elsevier, Guildford, GB, vol. 100, May 19, 2020 (May 19, 2020), XP086242842, 7 Pages, ISSN: 0262-8856, DOI: 10.1016/J.IMAVIS.2020.103934 [retrieved on May 19, 2020] abstract, figure 2, p. 5, left-hand column, line 2, p. 6, left-hand column, lines 30-33.

Chen, Xiaozhi, et al., "Multi-View 3D Object Detection Network for Autonomous Driving", Proceedings of the IEEE Conference on Computer Vision and Pattern Recognition, Jul. 2017, 9 pages.

Lim, et al., "Radar and Camera Early Fusion for Vehicle Detection in Advanced Driver Assistance Systems" Proceedings of NeurIPS (Workshop on Machine Learning for Autonomous Driving), 2019, 11 pages.

Wang, et al. "Pseudo-LiDAR from Visual Depth Estimation: Bridging the Gap in 3D Object Detection for Autonomous Driving", Jun. 2019, 9 pages.

\* cited by examiner

RADAR AND CAMERA DATA FUSION

BACKGROUND

1. Field of Invention

The present invention relates generally to the field of sensor data, and more specifically to fusing radar data and camera data.

2. Description of Related Art

Autonomous vehicles often use various sensors, such as cameras, radar devices, lidar devices, or the like. For example, such sensors may be used to identify objects around an autonomous vehicle. Different types of sensors may be considered complementary. For example, a camera may perform better in a perspective view. Additionally, a camera may provide information such as texture, color, and/or lighting that may be useful for identifying objects within camera data. However, a camera may not perform well under certain weather conditions, such as fog or rain. Conversely, a radar device may provide complementary information relative to a camera, such as velocity information of an object in motion. Moreover, a radar device may be advantageous in certain weather conditions, such as fog or rain. Radar devices and camera devices may each have their own advantages and shortcomings.

BRIEF SUMMARY

An example method for processing image data, according to this disclosure, comprises obtaining a radar point cloud and one or more frames of camera data, determining depth estimates of one or more pixels of the one or more frames of camera data, generating a pseudo lidar point cloud using the depth estimates of the one or more pixels of the one or more frames of camera data, wherein the pseudo lidar point cloud comprises a three-dimensional representation of at least one frame of the one or more frames of camera data, and determining one or more object bounding boxes based on the radar point cloud and the pseudo lidar point cloud.

An example device for processing image data, according to this disclosure, comprises a transceiver, a memory, and one or more processing units communicatively coupled with the transceiver and the memory. The one or more processing units are configured to obtain a radar point cloud and one or more frames of camera data, determine depth estimates of one or more pixels of the one or more frames of camera data, generate a pseudo lidar point cloud using the depth estimates of the one or more pixels of the one or more frames of camera data, wherein the pseudo lidar point cloud comprises a three-dimensional representation of at least one frame of the one or more frames of camera data; and determine one or more object bounding boxes based on the radar point cloud and the pseudo lidar point cloud.

An example device for processing image data, according to this disclosure, comprises means for obtaining a radar point cloud and one or more frames of camera data, means for determining depth estimates of one or more pixels of the one or more frames of camera data, means for generating a pseudo lidar point cloud using the depth estimates of the one or more pixels of the one or more frames of camera data, wherein the pseudo lidar point cloud comprises a three-dimensional representation of at least one frame of the one or more frames of camera data, and means for determining one or more object bounding boxes based on the radar point cloud and the pseudo lidar point cloud.

An example non-transitory computer-readable medium, according to this disclosure, stores instructions for processing image data. The instructions comprise code for obtaining a radar point cloud and one or more frames of camera data, determining depth estimates of one or more pixels of the one or more frames of camera data, generating a pseudo lidar point cloud using the depth estimates of the one or more pixels of the one or more frames of camera data, wherein the pseudo lidar point cloud comprises a three-dimensional representation of at least one frame of the one or more frames of camera data, and determining one or more object bounding boxes based on the radar point cloud and the pseudo lidar point cloud.

BRIEF DESCRIPTION OF THE DRAWINGS

Like reference symbols in the various drawings indicate like elements, in accordance with certain example implementations.

DETAILED DESCRIPTION

Figure 1:
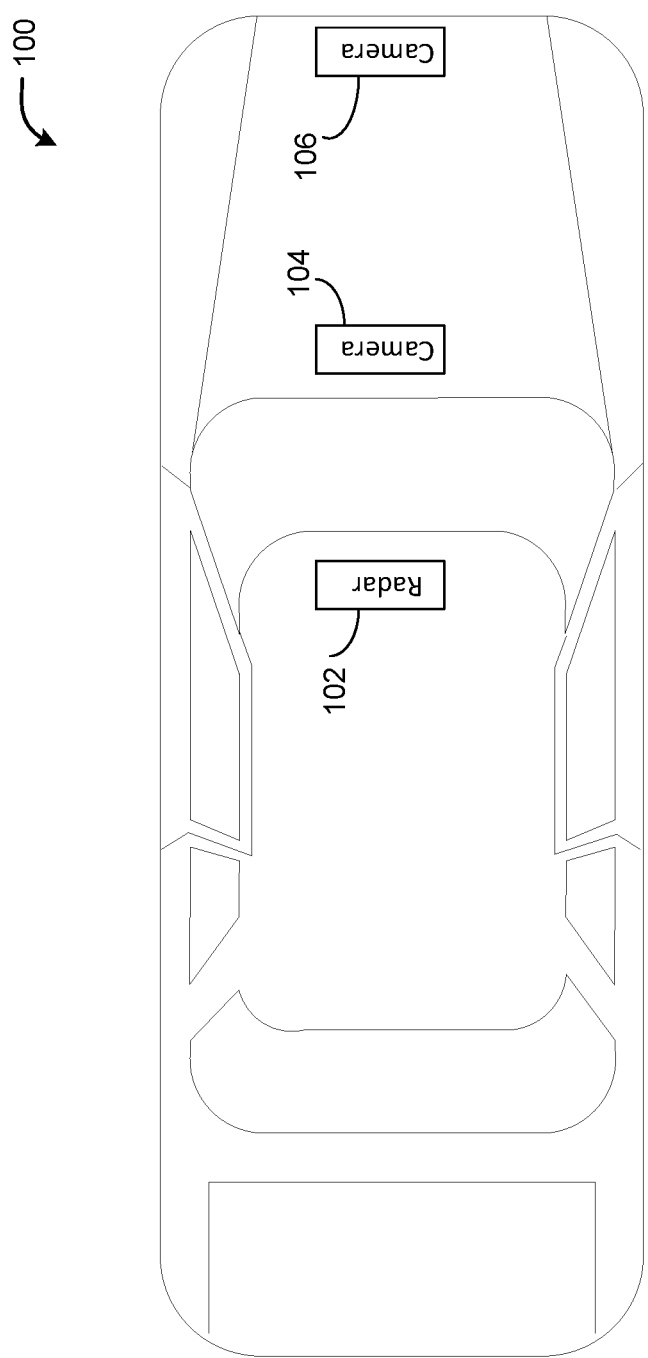
FIG. 1 is a schematic diagram of an example vehicle with example radar and camera devices, according to an embodiment.

As used herein, a "point cloud" refers to a set of data points in space. The set of data points may represent a two-dimensional (2D) scene or a three-dimensional (3D) scene. For example, a point may have x, y, and z coordinates that represent a location of the point in a 3D space. As another example, a point may have polar coordinates associated with a polar coordinate system, such as an azimuth angle, an elevation angle, and/or depth. A point cloud may be in various views, such as a bird's eye view, a perspective view, or the like. Manipulation from one view to another view may be possible by, for example, rotating the point cloud.

As used herein, "pseudo lidar" refers to a representation of camera data that incorporates estimated depth information of one or more pixels of the camera data. For example, pseudo lidar data may be represented as a 3D point cloud. As a more particular example, a pseudo lidar point cloud may include a set of data points, where coordinates of the data points (e.g., x, y, and/or z coordinates) are determined based on the camera data. Continuing with this example, a z coordinate of a point in a pseudo lidar point cloud may represent an estimated depth of one or more pixels of the camera data.

Vehicles, such as autonomous vehicles or semi-autonomous vehicles, may use various sensors to aid in vehicle control, for safety, etc. For example, sensors may be used to detect objects, such as pedestrians, other vehicles (e.g., cars, trucks, bicycles, or the like), traffic control objects, construction equipment, the road surface, curbs, or the like. Radar devices and cameras are frequently used sensors for capturing data that indicates locations of various objects, for example, in an environment of a vehicle.

In instances in which different types of sensors are used, such as radar devices and cameras, it may be useful to fuse or combine the data from two or more complementary types of sensors. For example, it may be advantageous to fuse or combine radar data and camera data prior to making control decisions of a vehicle. However, it may be difficult to fuse radar data and camera data. For example, radar data and camera data may capture very different perspectives, which can make it difficult to map radar data to camera data or vice versa. As a more particular example, radar data may produce a bird's eye view image that gives range, azimuth, and velocity of an object in polar coordinates. By contrast, cameras are often positioned such that they capture image data in a perspective view in Cartesian coordinates. Additionally, a camera field of view may be very different than a radar device field of view. In such cases, it may be difficult to fuse the radar data and the camera data, for example, in order to allow a control system to use both the radar data and the camera data.

The methods, systems, and media described herein describe techniques for fusing radar data and camera data. In some embodiments, the radar data may be fused with 2D camera data by estimating depth of pixels of the camera data and using the estimated depth to fuse the radar data and the camera data. One or more Object Bounding Boxes (OBBs) that indicate boundaries of detected objects may then be determined, for example, based on the fused radar data and camera data.

For example, as described herein, a radar point cloud and one or more frames of camera data may be obtained. The radar point cloud may correspond to radar data obtained via one or more radar devices, positioned, for example, on a roof or top windshield of a vehicle. The radar point cloud be in a bird's eye view. The one or more frames of camera data may be captured from one or more cameras, for example, positioned on a vehicle such that the one or more cameras capture perspective view image data. In some embodiments, depth estimates for pixels of the one or more frames of camera data may be determined. A pseudo lidar point cloud may be generated based on the one or more frames of camera data and the depth estimates. For example, the pseudo lidar point cloud may indicate depths of the one or more pixels in the one or more frames of camera data. One or more OBBs may then be determined based on the radar point cloud and/or the pseudo lidar point cloud. For example, in some embodiments, the OBBs may be determined by a trained machine learning model (e.g., PointGNN, PointPillars, PointRCNN, PointPainting, VoxelNet, or the like) that takes, as an input, a combined point cloud that combines the radar point cloud and the pseudo lidar point cloud.

In some embodiments, semantic segmentation information may be determined for obtained camera data. The semantic segmentation information may indicate, for example, clusters of pixels of the camera data that correspond to a particular class or label of object (e.g., a person, an animal, a vehicle, traffic control equipment, a road surface, or the like). In some embodiments, the semantic segmentation information may be applied to the radar point cloud, thereby generating a segmented radar point cloud that incorporates the semantic segmentation information, as shown in and described below in connection with FIG. 4. Applying semantic segmentation information to the radar point cloud may improve accuracy of OBBs by indicating points in the radar point cloud that are likely to be associated with the same object. Various techniques for applying semantic segmentation information to a radar point cloud are shown in and described below in connection with FIGS. 4 and 5.

In some embodiments, a pseudo lidar point cloud may be generated using depth estimates that are based on the semantic segmentation information. For example, as shown in and described below in connection with FIG. 6, a machine learning model that determines depth estimates for one or more frames of camera data may receive input from a machine learning model that generates semantic segmentation information. By determining depth estimates for camera data based on semantic segmentation information, the depth estimates may have improved accuracy. For example, the semantic segmentation information may indicate clusters of pixels likely to belong to the same object, which therefore have the same depth. By improving accuracy of depth estimates of the camera data, a pseudo lidar point cloud generated based on more accurate depth estimates may in turn be more accurate than a pseudo lidar cloud generated without semantic segmentation information.

In some embodiments, a radar device and/or a camera device may be positioned on a vehicle. The vehicle may be any type of vehicle, such as a car, a motorcycle, a truck, a bus, a van, or the like. In some embodiments, a vehicle may be an autonomous or semi-autonomous vehicle. A radar device and/or a camera device may be positioned at any suitable position on or in the vehicle. For example, radar devices and/or camera devices may be positioned on a top portion of the vehicle, on a front portion of the vehicle, on a side portion of the vehicle, on a back portion of the vehicle, or any combination thereof. Various numbers and combinations of radar devices and/or camera devices may be used. For example, multiple radar devices and/or multiple camera devices may be used such that radar data and/or camera data are obtained from around an entirety of the vehicle.

A radar device of a vehicle may be configured to transmit and/or receive radio waves to determine position information (e.g., range, azimuth, or the like) and/or velocity information of objects from which the radio waves reflect. Objects may include pedestrians, other vehicles, traffic routing equipment (e.g., cones, concrete barriers, barricades, or the like), construction equipment, or the like. Radar data obtained by a radar device may be in polar coordinates that indicate a range, azimuth, and/or velocity of objects from which radio waves are reflected. In some embodiments, the radar data may be in a bird's eye view.

A camera device of a vehicle may be configured to capture and/or obtain image data. The image data may include objects (e.g., pedestrians, other vehicles, traffic routing equipment, construction equipment, etc.), signage, traffic lights, or the like. In some embodiments, the image data may be in a perspective view.

FIG. 1 is a schematic diagram of a vehicle 100 with example radar and camera devices, according to an embodiment.

As illustrated in FIG. 1, vehicle 100 has a radar device 102. Radar device 102 is configured to transmit and/or receive radio waves to determine position information (e.g., range, velocity, angle of arrival, or the like) of objects from which the radio waves reflect. The radio waves may be of any suitable frequency, e.g., 25 GHz, 50 GHz, 75 Ghz, or the like. In some embodiments, radar device 102 may have one or more transmitting antennas to transmit radio waves and one or more receiving antennas to receive reflected radio waves. Radar device 102 may be configured to emit radio waves continually or in a pulsed manner. In some embodiments, radar device 102 may be associated with one or more computing devices that receive measurements from one or more receiving antennas and determines radar data based on the measurements. For example, the computing device may be configured to generate a radar point cloud, as discussed below in connection with FIG. 2.

As illustrated in FIG. 1, vehicle 100 has camera devices, such as camera 104 and camera 106. Each camera may have any suitable field of view (e.g., 40 degrees, 60 degrees, 120 degrees, or the like). A camera may be configured to capture or obtain camera data at a predetermined rate (e.g., one frame per second, five frames per second, or the like).

In some embodiments, radar data and camera data can be fused. For example, in some embodiments, the radar data may be represented as a radar point cloud. Continuing with this example, a pseudo lidar point cloud may be generated based on the camera data by estimating depth of one or more pixels of the camera data. Continuing still further with this example, in some embodiments, the radar point cloud and the pseudo lidar point cloud may be fused. In some embodiments, OBBs may be determined that determine boundaries of one or more objects represented in the radar point cloud and/or the pseudo lidar point cloud.

Figure 2:
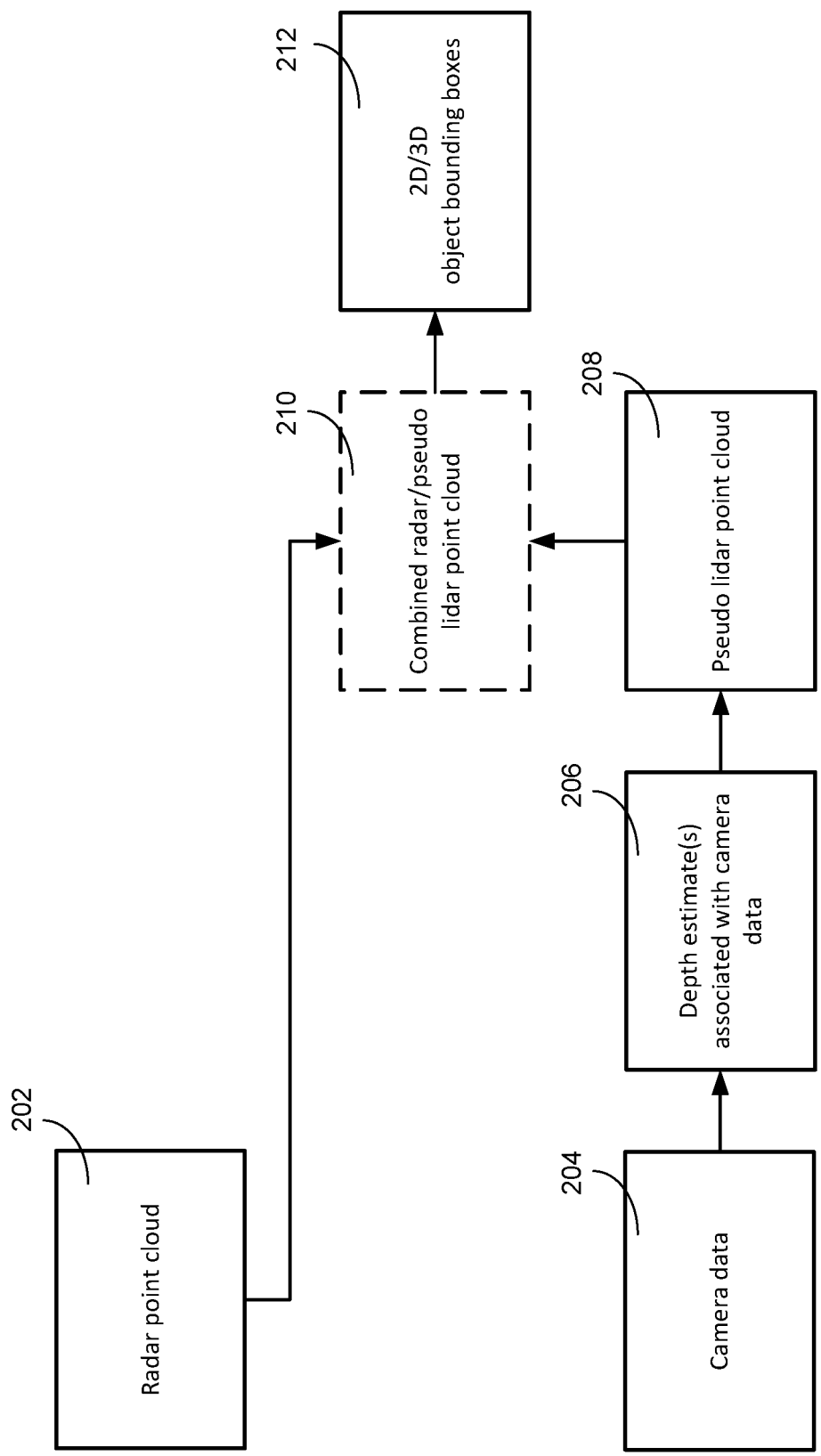
FIG. 2 is a block diagram of an example data flow for fusing radar data and camera data, according to an embodiment.

FIG. 2 is a block diagram of a data flow for fusing radar data and camera data, according to an embodiment.

A radar point cloud 202 may be obtained. As described below in connection with block 310 of FIG. 3, radar point cloud 202 may be generated based on radar data obtained from a radar device. In some embodiments, radar point cloud 202 may be in a bird's eye view.

Camera data 204 may be obtained. Camera data 204 may be monocular camera data captured from a single camera device. Alternatively, in some embodiments, camera data 204 may be binocular camera data captured from two camera devices that are closely spaced. In some embodiments, camera data 204 may include multiple frames of camera data. Two successive frames of camera data may be separated by any suitable time duration (e.g., 1 msec, 5 msec, 50 msec, 500 msec, or the like).

Depth estimate(s) 206 associated with camera data 204 may be determined. As described below in more detail in connection with block 320 of FIG. 3, example techniques for determining depth estimate(s) 206 include using a trained machine learning model that estimates depth for one or more pixels of camera data 204. Such a trained machine learning model may be supervised or unsupervised. In some embodiments, the trained machine learning model may be self-supervised.

Pseudo lidar point cloud 208 may be generated. For example, pseudo lidar point cloud 208 may be generated based on depth estimate(s) 206 and camera data 204. As a more particular example, in some embodiments, pseudo lidar point cloud 208 may be generated by performing backward projection to transform pixels of the camera data 204 in camera coordinates to points in pseudo lidar point cloud 208 in world coordinates.

A fused radar and pseudo lidar point cloud 210 may be generated. In some embodiments, radar point cloud 202 and pseudo lidar point cloud 208 may be combined. For example, in some embodiments, values of points in radar point cloud 202 may be used to adjust corresponding values of points in pseudo lidar point cloud 208. As another example, in some embodiments, values of points in pseudo lidar point cloud 208 may be used to adjust corresponding values of points in radar point cloud 202. It should be noted that, in some embodiments, radar point cloud 202 and pseudo lidar point cloud 208 may not be fused.

2D and/or 3D OBBs 212 may be determined. An OBB may be a rectangle (in the 2D case) or a rectangular prism (in the 3D case) that indicates boundaries of an object of interest. Each OBB may be defined by either 2D or 3D coordinates. In some embodiments, an OBB may be associated with a class that indicates a type of object likely associated with the OBB. Example types of objects include: a person, a vehicle, a sign, construction equipment, a road edge, or the like. In some embodiments, an OBB may be associated with a confidence value. The confidence value may indicate a confidence associated with the class assigned to the OBB and/or a confidence in the coordinates of the OBB.

In some embodiments, 2D and/or 3D OBBs 212 may be determined using a trained machine learning model, such as PointGNN, or the like. In some such embodiments, the trained machine learning model may take, as an input, fused radar and pseudo lidar point cloud 210. Additionally or alternatively, in some embodiments, the trained machine learning model may take, as inputs, radar point cloud 202 and pseudo lidar point cloud 208 (i.e., without combining radar point cloud 202 and pseudo lidar point cloud 208).

Figure 3:
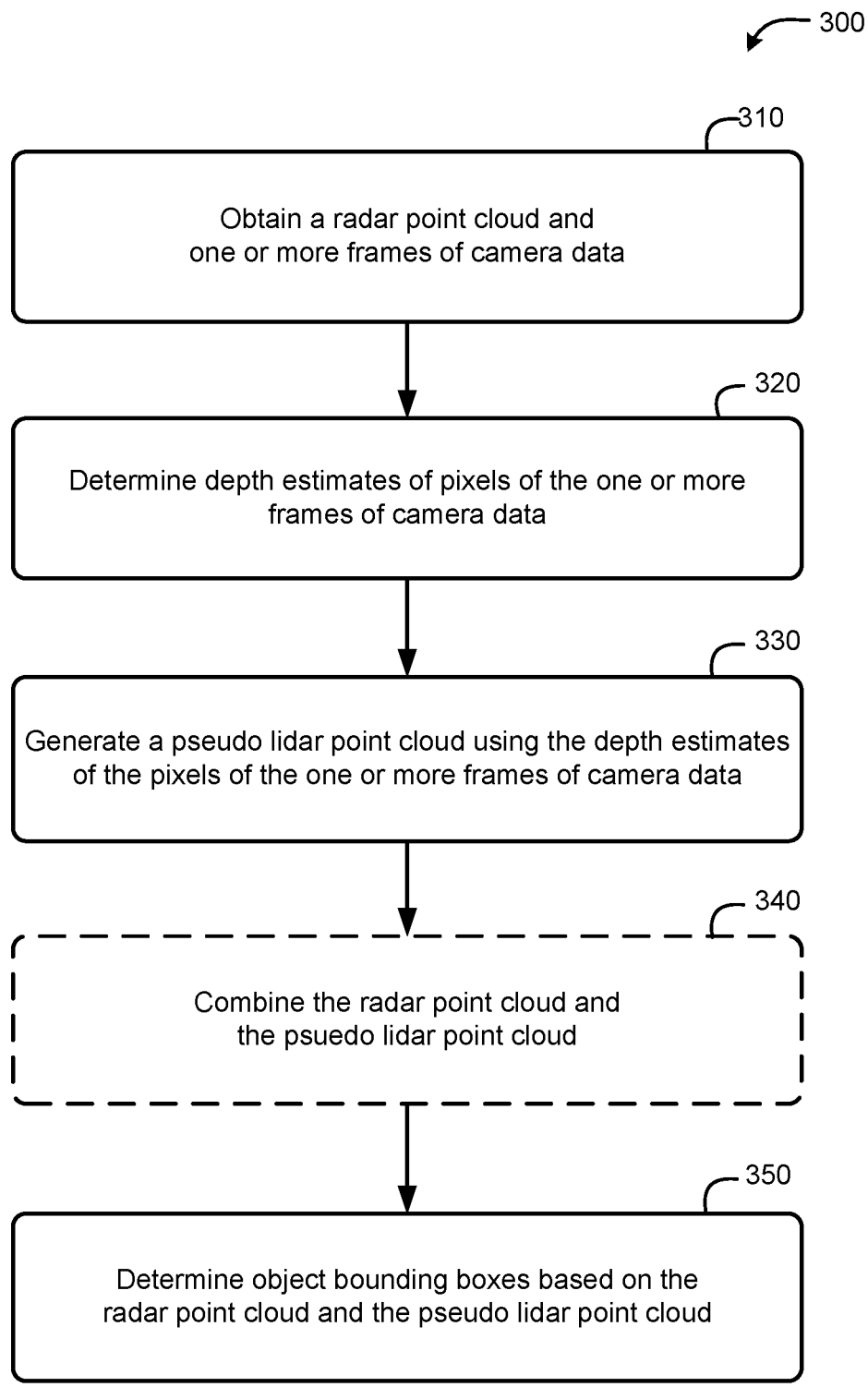
FIG. 3 is a flow diagram of an example method for fusing radar data and camera data, according to an embodiment.
Figure 8:
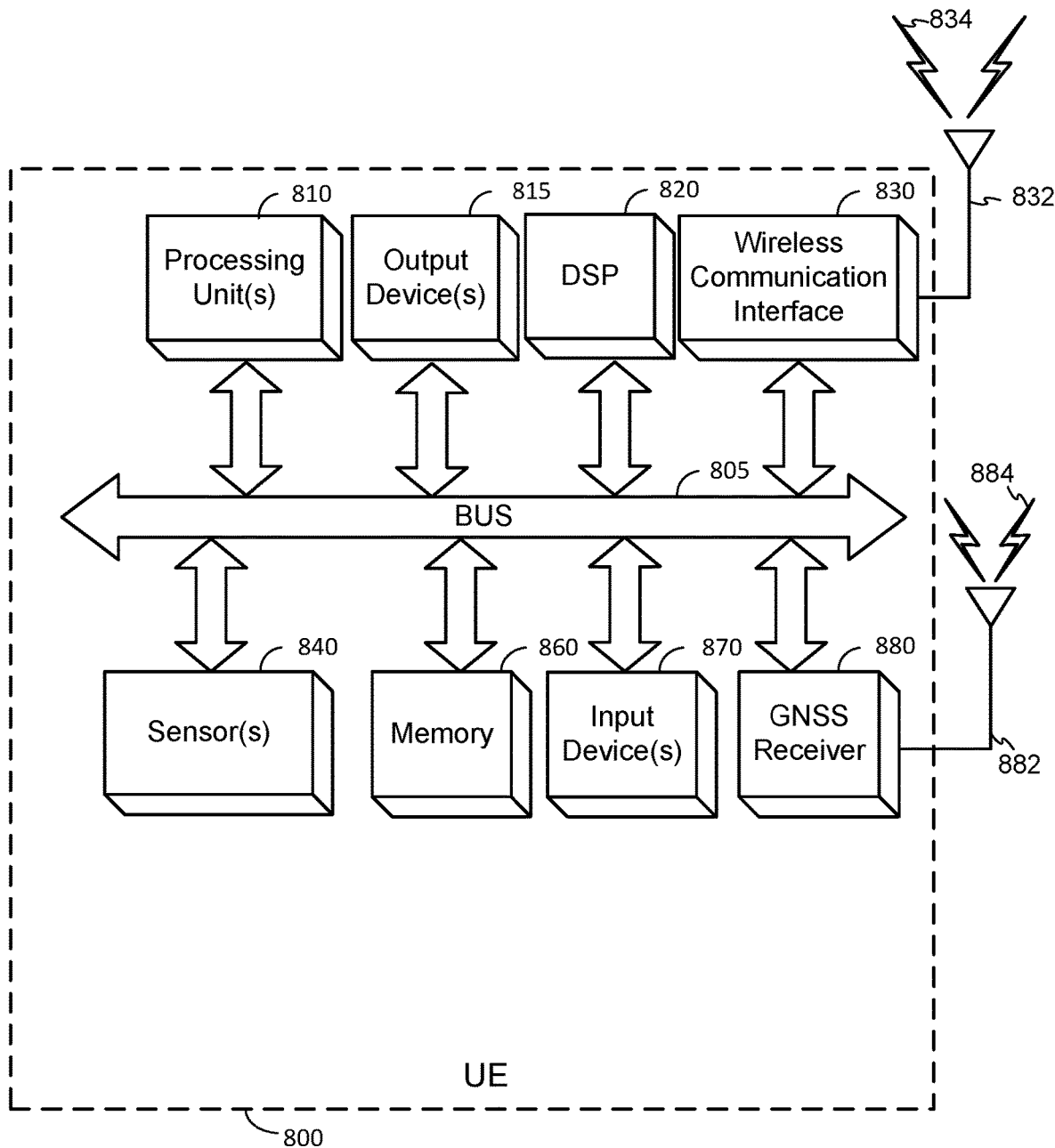
FIG. 8 is a block diagram of an embodiment of a computing device, which can be utilized in embodiments as described herein.

FIG. 3 is a flow diagram of a method 300 of fusing radar data and camera data, according to an embodiment. Means for performing the functionality illustrated in one or more of the blocks shown in FIG. 3 may comprise hardware and/or software components of a computing device, such as a computing device associated with a vehicle. Example components of a computing device are illustrated in FIG. 8, which are described in more detail below.

At block 310, the functionality comprises obtaining a radar point cloud and one or more frames of camera data. Means for performing functionality at block 310 may comprise one or more sensor(s) (e.g., one or more cameras and/or one or more radar devices associated with a vehicle), a processor of a computing device, and/or other components of a computing device, as illustrated in FIG. 8.

In some embodiments, the radar point cloud can be generated based on the radar data. For example, in some embodiments, the radar point cloud may represent a transformation of the radar data in polar coordinates to Cartesian coordinates.

In some embodiments, the radar point cloud may include elevational data. For example, in an instance in which the radar data is obtained from a radar device that is configured to or capable of performing elevation scanning, the radar data may include elevational radar data. Continuing with this example, elevational data of the point cloud may be based on radar data captured during elevational scanning. As another example, in an instance in which the radar data is obtained from a radar device that is not configured to or is not capable of performing elevation scanning, the radar point cloud may be generated based on approximations of elevational radar data. In some embodiments, approximations of elevational radar data may be determined based on external information. For example, in some embodiments, approximations of elevational radar data may be determined based on road surface information. As a more particular example, in some embodiments, road surface information that indicates whether a road ahead is increasing or decreasing in elevation may be used to determine an approximation of elevational radar data. As yet another example, in some embodiments, elevational radar data may be set to a constant value, for example, in cases in which approximations of elevational are difficult (e.g., due to lack of information regarding road surfaces or lack of access to a road surface model) and/or in which a radar device is not capable of performing elevational scanning.

In some embodiments, the one or more frames of camera data may be obtained from one or more camera devices (e.g., one camera device, two camera devices, five camera devices, or the like). In some embodiments, the one or more frames of camera data may be monocular camera data obtained from a single camera device. In some embodiments, the one or more frames of camera data may be binocular camera data. Each frame may include one or more pixels. In some embodiments, two or more frames of camera data may be temporally separated by a duration of time, such as 1 msec, 5 msec, 50 msec, 500 msec, or the like.

It should be noted that, in some embodiments, the one or more frames of camera data may be stored in association with the radar data. For example, radar data and one or more frames of camera data that are obtained substantially concurrently may be stored in association with each other within a database such that radar data and one or more frames of camera data that pertain to similar time points may be associated with each other.

At block 320, the functionality comprises determining depth estimates of pixels of the one or more frames of camera data. Means for performing the functionality at block 320 may comprise a processor of a computing device, and/or other components of a computing device, as illustrated in FIG. 8.

The depth estimates of pixels of the one or more frames of camera data may be determined using various techniques. For example, in some embodiments, the depth estimates of pixels of the one or more frames of camera data may be determined using a trained machine learning model. In some embodiments, the machine learning model may be a supervised machine learning model (e.g., that uses labeled training data) or an unsupervised machine learning model (e.g., that does not use labeled training data). In some embodiments, the machine learning model may be a self-supervised machine learning model in which labeled training data is not required. For example, in some embodiments a machine learning model that generates depth estimates may be a self-supervised machine learning model that uses geometrical consistency across neighboring or nearby frames of an image to learn a pattern (e.g., a depth of each pixel) from sequences of frames.

In instances in which the camera data is monocular data, the depth estimates of pixels of the one or more frames of camera data may be determined using Structure from Motion (SFM) information that estimates motion parallax. As a more particular example, in some embodiments, the one or more frames of camera data may be used as inputs to a trained machine learning model that predicts disparities between two frames of camera data, where the disparities may correlate with motion parallax, and therefore, depth. Continuing with this more particular example, in some embodiments, the trained machine learning model may generate depth estimates for one or more pixels of the camera data based on the disparities. In instances in which the camera data includes binocular camera data, depth estimates may be based on stereoscopic differences between corresponding frames of camera data from two camera devices.

In some embodiments, a machine learning model that generates depth estimates may be a Convolutional Neural Network (CNN), such as an encoder-decoder network, a Recurrent Neural Network, a U-Net, or the like. As a more particular example, in some embodiments, an encoder-decoder neural network may be used which takes, as an input, the one or more frames of camera data, and generates, as outputs, estimated depths of one or more pixels of the one or more frames of camera data. Such an encoder-decoder network may have any suitable number of convolutional layers (e.g., two, three, five, seven, or the like) and/or any suitable number of deconvolutional layers (e.g., two, three, five, seven, or the like). In some embodiments, a convolutional layer may be followed by a pooling layer that combines values of clusters of elements in a particular layer. Such a pooling layer may use max pooling and/or average pooling.

In some embodiments, the depth estimates may be generated using semantic segmentation information associated with the camera data. For example, in some embodiments, the semantic segmentation information may indicate clusters of pixels of the one or more frames of camera data that are likely to be associated with the same object. More detailed techniques for determining depth estimates using semantic segmentation information are shown in and described below in connection with FIGS. 4, 5, and 6.

At block 330, the functionality comprises generating a pseudo lidar point cloud using the depth estimates of the pixels of the one or more frames of camera data. Means for performing the functionality at block 330 may comprise a processor of a computing device, and/or other components of a computing device, as illustrated in FIG. 8.

In some embodiments, the pseudo lidar point cloud can be generated by transforming the camera data, in camera coordinates, to points of the pseudo lidar point cloud, in world coordinates, using the depth estimates. Transformation from camera coordinates to world coordinates may be performed using back projection.

At 340, the functionality comprises combining the radar point cloud and the pseudo lidar point cloud. Means for performing the functionality at block 340 may comprise a processor of a computing device, and/or other components of a computing device, as illustrated in FIG. 8.

In some embodiments, the radar point cloud and the pseudo lidar point cloud may be fused by adjusting the radar point cloud using values of the pseudo lidar point cloud, or vice versa. For example, in some embodiments, values of the radar point cloud may be used to adjust values of corresponding points in the pseudo lidar point cloud (e.g., x, y, or z coordinates). Continuing with this example, the adjusted pseudo lidar point cloud may be used as the combined or fused radar point cloud and pseudo lidar point cloud. As another example, in some embodiments, values of the pseudo lidar point cloud may be used to adjust values of corresponding points in the radar point cloud (e.g., x, y, or z coordinates). Continuing with this example, the adjusted radar point cloud may be used as the combined or fused radar point cloud and pseudo lidar point cloud.

As yet another example, in some embodiments, a combined radar point cloud and pseudo lidar point cloud may be generated by iterating through points of the radar point cloud and corresponding points of the pseudo lidar point cloud and selecting, at each iteration, a point from one of the radar point cloud or the pseudo lidar point cloud for inclusion in the combined point cloud. Selection may be based on, for example, a confidence of a depth estimate used to generate the point in pseudo lidar point cloud. As a more particular example, in an instance in which the depth estimate used to generate a particular point in the pseudo lidar point cloud is below a predetermined threshold, a corresponding point in the radar point cloud may be selected for inclusion in the combined point cloud.

In some embodiments, the combined point cloud may be used to determine OBBs at block 350, described below. In some embodiments, block 340 may be omitted. For example, in some such embodiments, OBBs may be determined at block 350 using the radar point cloud and the pseudo lidar point cloud (e.g., without combining the radar point cloud and the pseudo lidar point cloud).

At 350, the functionality comprises determining OBBs based on the radar point cloud and the pseudo lidar point cloud. Means for performing the functionality at block 350 may comprise a processor of a computing device, and/or other components of a computing device, as illustrated in FIG. 8.

In some embodiments, the OBBs may be determined using a trained machine learning model that generates, as outputs, one or more OBBs. Examples of such a trained machine learning model include PointGNN, or the like. In some embodiments, the trained machine learning model may take, as an input, the combined point cloud that combines the radar point cloud and the pseudo lidar point cloud, as described above in connection with block 340. Alternatively, in some embodiments, the trained machine learning model may take, as inputs, the radar point cloud and the pseudo lidar point cloud.

The OBBs may be 2D or 3D. For example, in some embodiments, 2D OBBs may be determined in an instance in which the radar data from which the radar point cloud is obtained does not include elevational data (e.g., in which the radar data is 2D radar data). Continuing with this example, 2D OBBs may be determined by transforming the pseudo lidar point cloud to a 2D representation, such as a bird's eye view. A bird's eye view transformation may be performed by, for example, rotating the pseudo lidar point cloud to a bird's eye view and collapsing points of the rotated pseudo lidar point cloud to a 2D representation. In some such embodiments, the pseudo lidar point cloud may be transformed to a 2D representation prior to block 340. That is, in some embodiments, the combined point cloud generated at block 340 may be generated using a 2D representation of the pseudo lidar point cloud. Alternatively, in some embodiments, the 2D representation of the pseudo lidar point cloud may be generated prior to block 350. That is, in some embodiments, a trained machine learning model may take, as an input, a 2D representation of the pseudo lidar point cloud to generate 2D OBBs.

Method 300 may then end.

In some embodiments, semantic segmentation information may be determined for camera data. For example, the semantic segmentation information may indicate clusters of pixels of the camera data that are likely to be associated with the same object (e.g., a vehicle, a person, a sign, construction equipment, a road, or the like). The semantic segmentation information may be determined using a trained machine learning model. In some embodiments, the machine learning model may be a CNN (e.g., an encoder-decoder network, a U-Net, or the like), as shown in and described below in connection with FIG. 6.

In some embodiments, the semantic segmentation information may be applied to the radar point cloud such that the radar point cloud incorporates the semantic segmentation information. Incorporation of semantic segmentation information to the radar point cloud may allow OBBs determined based at least in part on the radar point cloud to have a higher accuracy.

In some embodiments, the semantic segmentation information may be applied to the radar point cloud based on 2D camera data. For example, semantic segmentation information may be determined for 2D camera data. Continuing with this example, the 2D camera data may be transformed to a bird's eye view, where the bird's eye view representation of the camera data is associated with the semantic segmentation information. Continuing further with this example, the semantic segmentation information may be applied to the radar point cloud by assigning one or more clusters of points in the radar point cloud to a cluster indicated in the semantic segmentation information of bird's eye view representation of the camera data.

Alternatively, in some embodiments, the semantic segmentation information may be applied to the radar point cloud based on depth estimates of pixels of one or more frames of the camera data. In some such embodiments, the depth estimates of the pixels may be generated based on semantic segmentation information, as shown in and described below in connection with block 560 of FIG. 5 and in connection with FIG. 6. In some embodiments, the depth estimates, which themselves incorporate the semantic segmentation information, may be used to apply the semantic segmentation information to the radar point cloud. For example, in some embodiments, the depth estimates may be used to identify clusters of points in the radar point cloud that are likely to correspond to the same object.

It should be noted that, applying semantic segmentation information to the radar point cloud based on 2D camera data may be computationally faster, because the semantic segmentation information can be applied to the radar point cloud without waiting for depth estimates that incorporate the semantic segmentation information. Conversely, applying semantic segmentation information to the radar data using depth estimates of pixels of the camera data that have themselves been determined using semantic segmentation information may generate more accurate OBBs.

Figure 4:
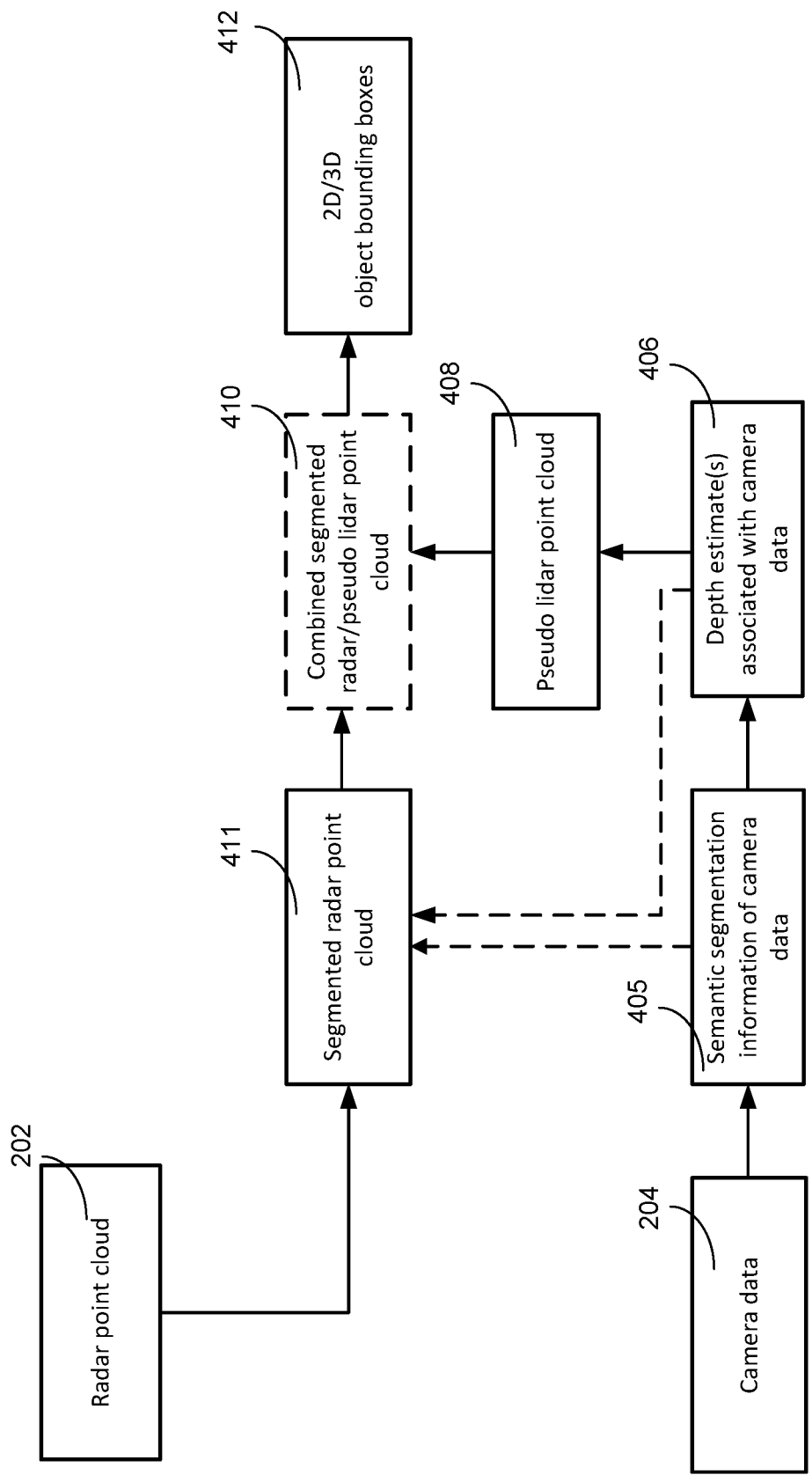
FIG. 4 is a block diagram of an example data flow for fusing radar data and camera data using semantic segmentation information, according to an embodiment.

FIG. 4 is a block diagram of a data flow for fusing radar data and camera data using semantic segmentation information, according to an embodiment.

As described above in connection with FIG. 2, radar point cloud 202 and camera data 204 can be obtained. As discussed above in connection with FIG. 2, camera data 204 may be 2D data. Camera data 204 may be monocular camera data or binocular camera data.

Semantic segmentation information 405 can be determined based on camera data 204. Semantic segmentation information 405 may indicate clusters of pixels of camera data 204 that are likely to be associated with the same object. Examples of types of objects include vehicles, people, animals, signs, construction equipment, traffic control equipment, road surfaces, or the like. In some embodiments, semantic segmentation information 405 may be determined using a trained machine learning model, such as a CNN. An example neural network architecture for determining semantic segmentation information is shown in and described below in connection with FIG. 6.

In some embodiments, semantic segmentation information 405 may be applied to the radar point cloud to generate segmented radar point cloud 411. For example, in some embodiments, camera data 204, which is associated with semantic segmentation information 405, may be transformed to be in a view that corresponds to a view of radar point cloud 202. As a more particular example, camera data 204 may be transformed to a bird's eye view. Continuing with this example, semantic segmentation information 405 may be applied to radar point cloud 202 by assigning clusters of points in radar point cloud 202 based on clusters of pixels indicated in semantic segmentation information 405. As a more particular example, in an instance in which semantic segmentation information 405 indicates that a first cluster of pixels in the bird's eye view transformation of camera data 204 corresponds to a first object (e.g., a car, a person, etc.), a cluster of points in radar point cloud 202 corresponding to the first cluster of pixels may be identified. Continuing with this more particular example, the cluster of points in radar point cloud 202 may then be associated with the first object in segmented radar point cloud 411.

Alternatively, in some embodiments, depth estimates 406 associated with camera data 204 may be determined using semantic segmentation information 405. For example, in some embodiments, portions of semantic segmentation information 405 may be fed to layers of a neural network that generates depth estimates 406, as shown in and described below in connection with FIG. 6. Accordingly, in instances in which depth estimates 406 are generated using semantic segmentation information 405, depth estimates 406 may incorporate and/or be based on semantic segmentation information 405. In some embodiments, segmented radar point cloud 411 may be generated using depth estimates 306.

Similar to what is described above in connection with FIG. 2, a pseudo lidar point cloud 408 may be generated, where pseudo lidar point cloud 408 represents a three-dimensional representation of camera data 204. Note that, unlike what is shown in FIG. 2, depth estimates 406 used to generate pseudo lidar point cloud 308 incorporate semantic segmentation information. Accordingly, pseudo lidar point cloud 408 incorporates semantic segmentation information.

Similar to what is described above in connection with FIG. 2, a combined point cloud 410 may be generated which combines segmented radar point cloud 411 and pseudo lidar point cloud 408. For example, combined point cloud 410 may be generated by adjusting values of segmented radar point cloud 411 based on corresponding values of pseudo lidar point cloud 408, or vice versa. As another example, combined point cloud 410 may be generated by iterating through values of segmented radar point cloud 411 and corresponding values of pseudo lidar point cloud 408, and, for each iteration, selecting one of the segmented radar point cloud value or the pseudo lidar point cloud value for inclusion in combined point cloud 410. In some embodiments, generation of combined point cloud 410 may be omitted.

Similar to what is described above in connection with FIG. 2, 2D or 3D OBBs 412 can be determined. The 2D or 3D OBBs may be determined using a trained machine learning model (e.g., PointGNN, or the like). For example, in some embodiments, combined point cloud 310 may be used as an input to the trained machine learning model. As another example, in some embodiments, segmented radar point cloud 411 and pseudo lidar point cloud 408 may be used as inputs to the trained machine learning model.

It should be noted that, in instances in which 2D OBBs are determined, pseudo lidar point cloud 408 may be transformed to a 2D representation. For example, in some embodiments, pseudo lidar point cloud 408 may be rotated to a bird's eye view. Continuing with this example, the rotated pseudo lidar point cloud may be collapsed to a 2D representation. In some embodiments, the 2D representation may be determined prior to combining with segmented radar point cloud 411. Alternatively, in instances in which combined point cloud 410 is not used to generate the 2D OBBs, the 2D representation of pseudo lidar point cloud 408 may be generated prior to determination of the 2D OBBs. For example, a 2D representation of pseudo lidar point cloud 408 and segmented radar point cloud 411 may be used as an input to a trained machine learning model that generates the 2D OBBs.

Figure 5:
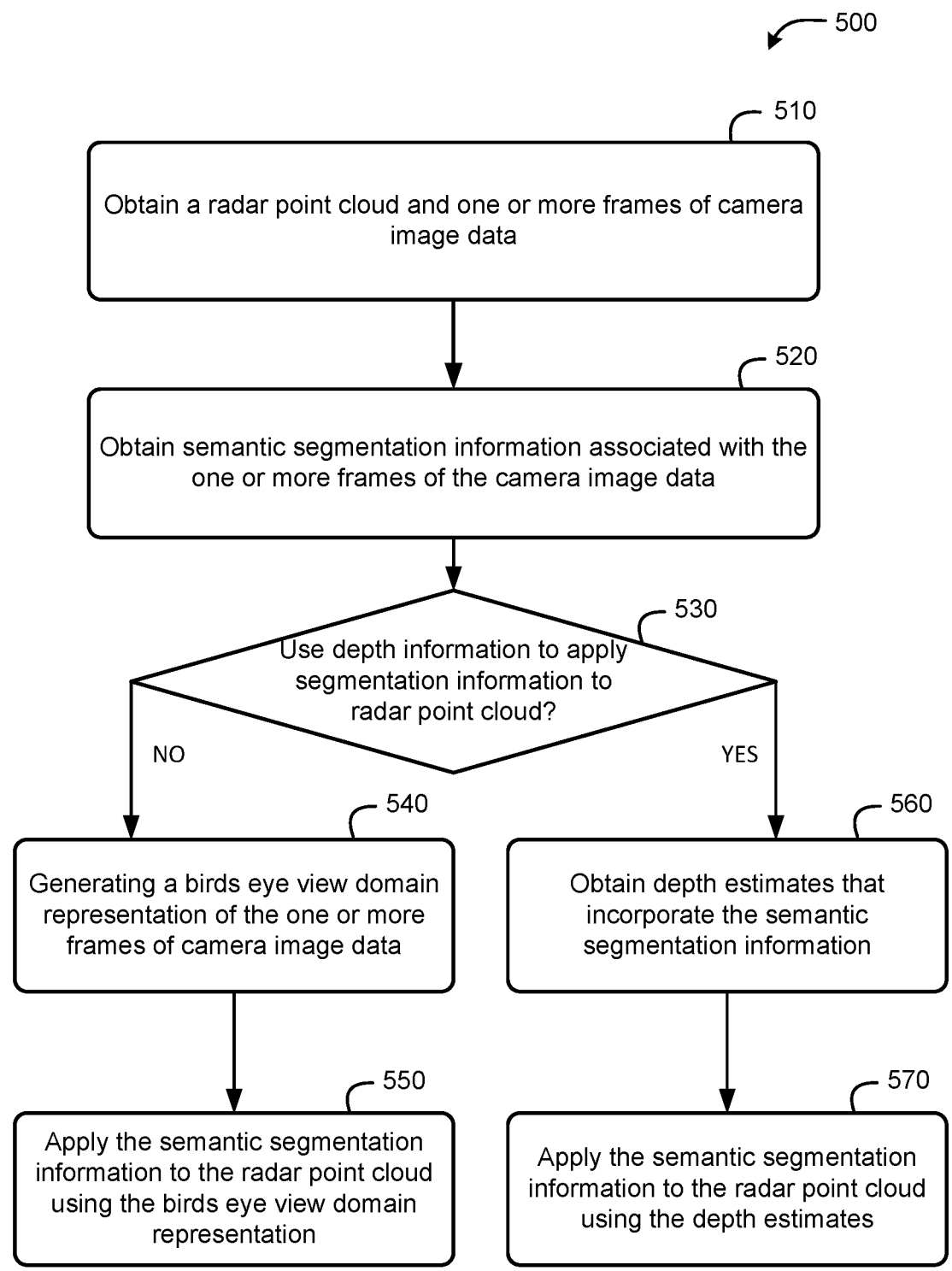
FIG. 5 is a flow diagram of an example method for applying semantic segmentation information to radar data, according to an embodiment.

FIG. 5 is a flow diagram of a method 500 of applying semantic segmentation information to a radar point cloud, according to an embodiment. Means for performing the functionality illustrated in one or more of the blocks shown in FIG. 5 may comprise hardware and/or software components of a computing device, such as a computing device associated with a vehicle. Example components of a computing device are illustrated in FIG. 8, which are described in more detail below.

At block 510, the functionality comprises obtaining a radar point cloud and one or more frames of camera data. Means for performing functionality at block 510 may comprise one or more sensor(s) (e.g., one or more cameras and/or one or more radar devices associated with a vehicle), a processor of a computing device, and/or other components of a computing device, as illustrated in FIG. 8.

It should be noted that, in some embodiments, the radar point cloud may be a point cloud in a bird's eye view. In some embodiments, the one or more frames of camera image data may be in a perspective view. More detailed techniques for obtaining a radar point cloud and one or more frames of camera data are described above in connection with block 310 of FIG. 3.

At block 520, the functionality comprises obtaining semantic segmentation information associated with the one or more frames of the camera image data. Means for performing the functionality at block 520 may comprise a processor of a computing device, and/or other components of a computing device, as illustrated in FIG. 8.

The semantic segmentation information may classify one or more pixels of the one or more frames of the camera image data as belonging to particular classes or labels of objects. Example objects include vehicles, people, animals, trees, construction equipment, road surfaces, traffic control equipment, or the like. It should be noted that, in some embodiments, an object type, such as "vehicles," may be further sub-divided. For example, the classes or labels may correspond to sub-categories of vehicles, such as bicycles, cars, trucks, delivery trucks, or the like. By classifying one or more pixels as belonging to particular classes or labels of objects, the semantic segmentation information may identify clusters of pixels of the one or more frames of the camera image data that are associated with the same class or label of object. For example, the semantic segmentation information may identify a first cluster of pixels as associated with a person (e.g., a pedestrian), and a second cluster of pixels as associated with a vehicle.

The semantic segmentation information may be obtained from a trained machine learning model. For example, the trained machine learning model may take, as inputs, the one or more frames of the camera image data, and may generate, as outputs, labels for pixels of the one or more frames of the camera image data that indicate an object that pixel has been classified as associated with. The machine learning model may be a CNN (e.g., an encoder-decoder network, a U-Net, or the like).

At 530, the functionality comprises determining whether to use depth information to apply semantic segmentation information to the radar point cloud. Means for performing the functionality at block 530 may comprise a processor of a computing device, and/or other components of a computing device, as illustrated in FIG. 8.

It should be noted that using depth information to apply the semantic segmentation information may include determining depth estimates for pixels of the one or more frames of the camera image data. Accordingly, using the depth information to apply the semantic segmentation information to the radar point cloud may involve waiting for the depth estimates to be determined before the semantic segmentation information can be applied to the radar point cloud. Therefore, using the depth information to apply the semantic segmentation information to the radar point cloud may take longer than applying the semantic segmentation information to the radar point cloud without using the depth information.

In some embodiments, a determination of whether to use the depth information to apply the semantic segmentation information to the radar point cloud can be made based on various factors. For example, in some embodiments, a determination that the depth information is to be used to apply the semantic segmentation information to the radar point cloud may be based on a quality of the camera image data and/or based on a quality of the radar data corresponding to the radar point cloud. As a more particular example, in some embodiments, a determination that the depth information is to be used may be determined in response to determining that the quality of the radar data and/or the quality of camera data is below a predetermined quality threshold. As another example, in some embodiments, a determination that the depth information is not to be used to apply the semantic segmentation information to the radar point cloud may be made in response to determining that a segmented radar point cloud is to be generated in less than a predetermined duration of time. As a more particular example, in an instance in which it is determined that the segmented radar point cloud is to be generated more quickly that the depth information can be generated, a determination that the depth information is not to be used to apply the semantic segmentation information to the radar point cloud can be made. As yet another example, in some embodiments, a determination of whether to use the depth information to apply the semantic segmentation information to the radar point cloud may be based on various hardware considerations, such as processor speed.

If, at block 530, it is determined that the depth information is not to be used to apply the semantic segmentation information to the radar point cloud ("no" at block 530), method 500 can proceed to block 540.

At 540, the functionality comprises generating a bird's eye view representation of the one or more frames of camera image data. Means for performing the functionality at block 530 may comprise a processor of a computing device, and/or other components of a computing device, as illustrated in FIG. 8.

In some embodiments, the bird's eye view representation of the one or more frames of camera image data may be generated by performing inverse projection mapping on the one or more frames of camera image data. For example, in some embodiments, the radar point cloud may be transformed from polar coordinates to Cartesian coordinates. Continuing with this example, a transformation may be determined that relates the Cartesian coordinates in the radar plane to the imaging plane associated with the one or more frames of camera image data (e.g., using calibration information that projects the Cartesian coordinates in the radar plane to coordinates in the imaging plane). Continuing further with this example, an inverse of the transformation may be applied to generate the bird's eye view representation of the one or more frames of camera image data.

It should be noted that the bird's eye view representation of the one or more frames of camera image data are associated with the semantic segmentation information. That is, clusters of pixels that were classified as belonging to a particular class or label of object in the perspective view may maintain the classification when transformed to the bird's eye view representation.

At 550, the functionality comprises applying the semantic segmentation information to the radar point cloud using the bird's eye view representation of the one or more frames of camera image data. Means for performing the functionality at block 550 may comprise a processor of a computing device, and/or other components of a computing device, as illustrated in FIG. 8.

In some embodiments, the semantic segmentation information may be applied by identifying a cluster of pixels in the bird's eye view representation assigned to a particular class or label, identifying points in the radar point cloud corresponding to the cluster of pixels, and assigning the identified points in the radar point cloud to the classification associated with the cluster of pixels. In some embodiments, this process may be repeated over multiple identified clusters of pixels.

Referring back to block 530, if, at block 530, it is determined that depth information is to be used to apply the semantic segmentation information to the radar point cloud ("yes") at block 530, method 500 can proceed to block 560.

At block 560, the functionality comprises obtaining depth estimates that incorporate the semantic segmentation information. Means for performing the functionality at block 560 may comprise a processor of a computing device, and/or other components of a computing device, as illustrated in FIG. 8.

In some embodiments, depth estimates for pixels of the one or more frames of the camera image data may be generated in a manner such that the depth estimates themselves incorporate the semantic segmentation information. By incorporating the semantic segmentation information into generation of the depth estimates, the depth estimates may have an improved accuracy.

In some embodiments, the depth estimates may be generated using a CNN (e.g., an encoder-decoder network, a U-Net, or the like) where layers (e.g., deconvolutional layers) receive input from a CNN that generates the semantic segmentation information. An example of such a neural network architecture is shown in and described below in more detail below in connection with FIG. 6.

At block 570, the functionality comprises applying the semantic segmentation information to the radar point cloud using the depth estimates. Means for performing the functionality at block 570 may comprise a processor of a computing device, and/or other components of a computing device, as illustrated in FIG. 8.

In some embodiments, the semantic segmentation information may be applied to the radar point cloud using the depth estimates by identifying a cluster of pixels that have been classified as associated with a particular class or label of object based on the semantic segmentation information, identifying depth information associated with the cluster of pixels, and identifying points in the radar point cloud based on the depth information. The identified points in the radar point cloud may then be assigned to the classification of the cluster of pixels. In some embodiments, this process may be repeated for multiple clusters of pixels that have been identified in the semantic segmentation information.

Method 500 may then end.

In some embodiments, depth estimates may be generated for pixels of one or more frames of camera image data, where the depth estimates are generated using semantic segmentation information. By generating the depth estimates using the semantic segmentation information, the semantic segmentation information may in effect be incorporated into the depth estimates.

For example, in some embodiments, the depth estimates may be generated using a CNN (e.g., an encoder-decoder network, a U-Net, or the like) that receives information from a CNN that generates semantic segmentation information. As a more particular example, in some embodiments, one or more layers of the depth estimation network may receive information from one or more layers of the semantic segmentation network. The one or more layers may be deconvolution layers. In some embodiments, the information from the semantic segmentation network may correspond to features that have been identified by the semantic segmentation network, such as features associated with particular classes or labels of objects.

It should be noted that the semantic segmentation information may have a different resolution than the depth estimates. For example, depth estimates may be relatively coarse in resolution, whereas semantic segmentation information may provide information at a more fine-grained resolution. Accordingly, providing semantic segmentation information to a depth estimation network may allow higher resolution semantic segmentation information to be incorporated into lower resolution depth estimates.

Figure 6:
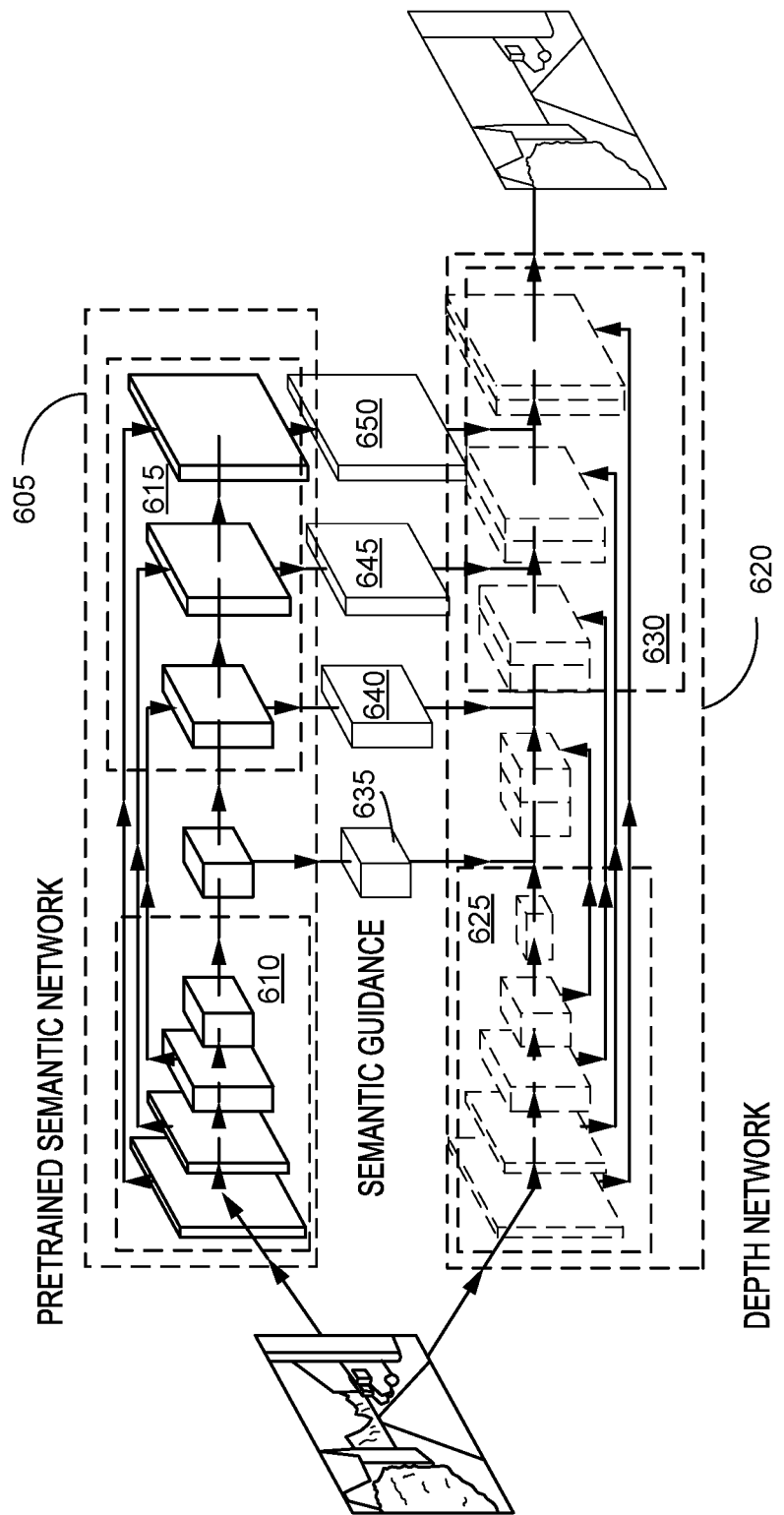
FIG. 6 is a schematic diagram of a neural network architecture for determining depth information using semantic segmentation information, according to an embodiment.

FIG. 6 illustrates a schematic diagram of an example neural network architecture for determining depth information using semantic segmentation information, according to an embodiment.

FIG. 6 depicts a semantic segmentation network 605. As illustrated, semantic segmentation network 605 may be a CNN (e.g., an encoder-decoder network, a U-Net, or the like). Semantic segmentation network 605 includes a series of convolution layers 610 and a series of deconvolution layers 615.

FIG. 6 also depicts a depth estimation network 620. As illustrated, depth estimation network 620 may be a CNN (e.g., an encoder-decoder network, a U-Net, or the like). Depth estimation network 620 includes a series of convolution layers 625 and a series of deconvolution layers 630.

As illustrated, semantic segmentation network 605 may provide information to depth estimation network 620 by providing information indicating features identified by semantic segmentation network 605. For example, features 635, 640, 645, and/or 650 may be provided. As illustrated, each of features 635, 640, 645, and 650 corresponds to a deconvolution layer of semantic segmentation network 605.

In some embodiments, a feature (e.g., one of features 635, 640, 645, and/or 650) of semantic segmentation network 605 may be provided to depth estimation network 620 by incorporating the feature in a layer (e.g., a deconvolution layer) of depth estimation network 620. The feature may be incorporated in using various techniques, such as by convolving the feature from the semantic segmentation network 605 with a feature at the corresponding layer of depth estimation network 620, interpolating the feature at the corresponding layer of depth estimation network 620 using the feature from the semantic segmentation network 605, multiplying the feature from the semantic segmentation network 605 with the feature from the corresponding layer of depth estimation network 620, adding the feature from the semantic segmentation network 605 with the feature at the corresponding layer of the depth estimation network 620, or the like.

It should be noted that although FIG. 6 illustrates features 635, 640, 645, and 650 being provided to depth estimation network 620, this is merely an illustrative example. In some embodiments, more or fewer features may be provided. For example, in some embodiments, a single feature from semantic segmentation network 605 may be provided to depth estimation network 620. As a more particular example, in some embodiments, a latest feature (e.g., feature 650) may be provided to a latest deconvolution layer of depth estimation network 620.

It should be noted that, in some embodiments, semantic segmentation network 605 and depth estimation network 620 may be trained concurrently. Alternatively, in some embodiments, semantic segmentation network 605 may be pre-trained, and features from an already trained semantic segmentation network 605 may be provided to depth estimation network 620.

Figure 7:
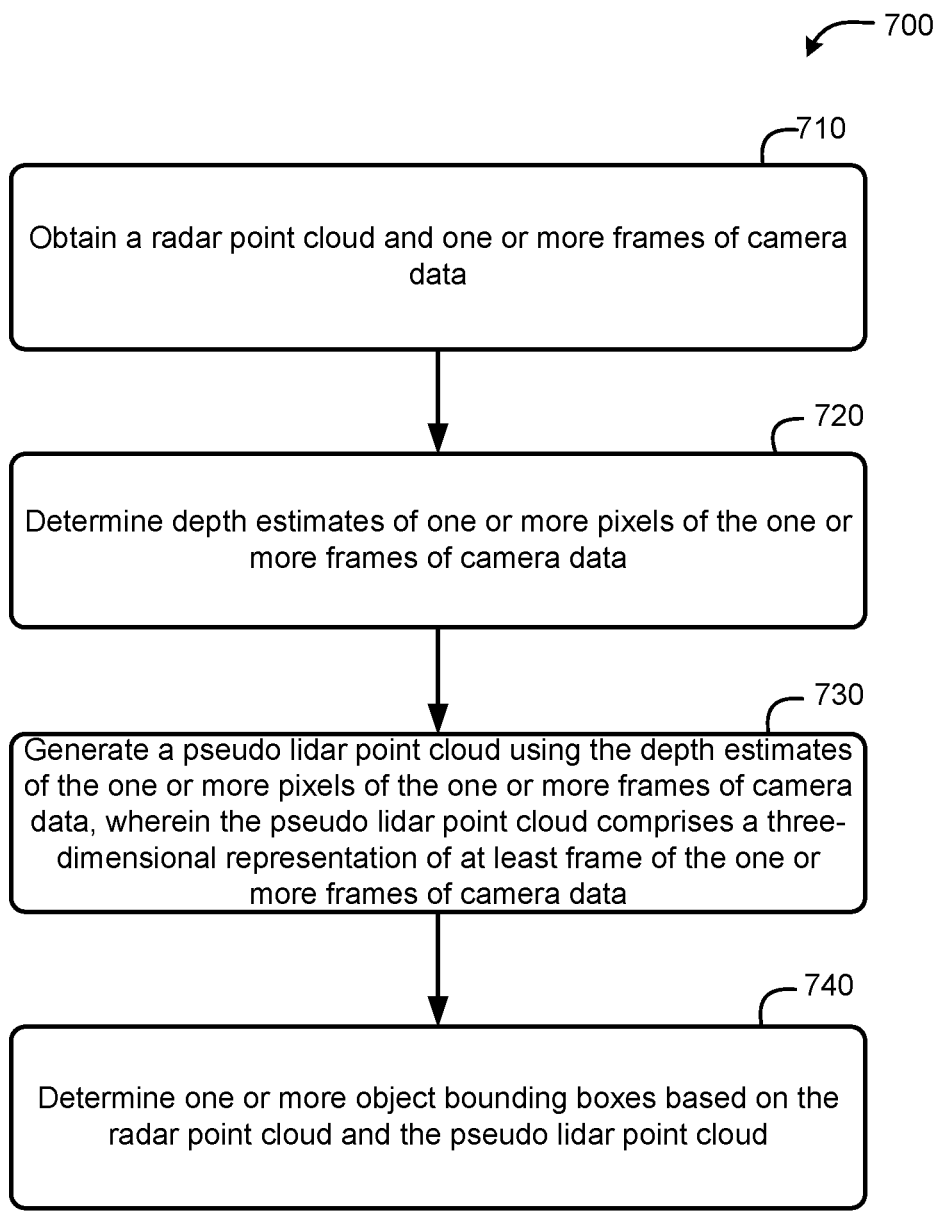
FIG. 7 is a flow diagram of an example method for fusing radar data and camera data, according to an embodiment.

FIG. 7 is a flow diagram of a method 700 of fusing radar data and camera data, according to an embodiment. Means for performing the functionality illustrated in one or more of the blocks shown in FIG. 7 may comprise hardware and/or software components of a computing device, such as a computing device associated with a vehicle. Example components of a computing device are illustrated in FIG. 8, which are described in more detail below.

At block 710, the functionality comprises obtaining a radar point cloud and one or more frames of camera data. Means for performing functionality at block 710 may comprise one or more sensor(s) (e.g., one or more cameras and/or one or more radar devices associated with a vehicle), a processor of a computing device, and/or other components of a computing device, as illustrated in FIG. 8.

As described above in connection with FIG. 3, the radar point cloud may be obtained from radar data captured by a radar device. In some embodiments, the radar point cloud may be in a bird's eye view. As described above in connection with FIG. 3, the one or more frames of camera data may be captured from one or more cameras. The one or more frames of camera data may be monocular camera data, or binocular camera data.

At block 720, the functionality comprises determining depth estimates of one or more pixels of the one or more frames of camera data. Means for performing the functionality at block 720 may comprise a processor of a computing device, and/or other components of a computing device, as illustrated in FIG. 8.

In some embodiments, the depth estimates may be determined using a machine learning model, such as a CNN (e.g., an encoder-decoder network, a U-Net, or the like). In some embodiments, the machine learning model may be a self-supervised machine learning model that does not require manually annotated training data. In some embodiments, the machine learning model may be a machine learning model that provides depth estimates of monocular camera data.

In some embodiments, as shown in and described above in connection with FIG. 6, the depth estimates may be determined using semantic segmentation information associated with the one or more frames of camera data. For example, as shown in and described above in connection with FIG. 6, a machine learning model that generates the depth estimates of the one or more frames of camera data may receive input from a machine learning model that determines semantic segmentation information of the one or more frames of camera data. As a more particular example, in some embodiments, the input may be provided as features from one or more layers of a semantic segmentation network provided to one or more layers of a depth estimation network, as shown in and described above in connection with FIG. 6.

At block 730, the functionality comprises generating a pseudo lidar point cloud using the depth estimates of the one or more pixels of the one or more frames of camera data, wherein the pseudo lidar point cloud comprises a three-dimensional representation of the one or more frames of camera data. Means for performing the functionality at block 730 may comprise a processor of a computing device, and/or other components of the computing device, as shown in FIG. 8.

In some embodiments, the pseudo lidar point cloud may be generated by transforming the one or more frames of the camera data from a camera coordinate system to a world coordinate system using the depth estimates.

At block 740, the functionality comprises determining one or more OBBs based on the radar point cloud and the pseudo lidar point cloud. In some embodiments, the OBBs may be 2D or 3D. In some embodiments, each OBB can indicate boundaries of a rectangle (in the 2D case) or a rectangular prism (in the 3D case) that correspond to an object detected in the radar point cloud and/or the pseudo lidar point cloud. In some embodiments, the OBBs may be determined using a trained machine learning model, such as PointGNN or the like.

In some embodiments, a trained machine learning model that determines one or more OBBs may take, as inputs, both the radar point cloud and the pseudo lidar point cloud. Alternatively, in some embodiments, a trained machine learning model that determines one or more OBBs may take, as an input, a combination of the radar point cloud and the pseudo lidar point cloud. In some such embodiments, the radar point cloud and the pseudo lidar point cloud may be combined using various techniques, such as adjusting values of the radar point cloud using values of the pseudo lidar point cloud, adjusting values of the pseudo lidar point cloud using values of the radar point cloud, selecting, for each point in the combined point cloud, a value from one of the radar point cloud or the pseudo lidar point cloud, or the like.

It should be noted that, in instances in which the one or more OBBs are 2D OBBs, the pseudo lidar point cloud may be transformed to a 2D representation. The 2D representation may be in a bird's eye view. In some embodiments, the 2D representation may be generated by rotating the 3D pseudo lidar point cloud to a particular view (e.g., a bird's eye view) corresponding to a view of the radar point cloud. Continuing with this example, the rotated 3D pseudo lidar point cloud may be collapsed to generate the 2D representation. In some embodiments, the 2D representation of the pseudo lidar point cloud may be generated prior to combination with the radar point cloud, as described above.

Method 700 may then end.

FIG. 8 illustrates an embodiment of a computing device 805, which can be utilized as described herein above (e.g., in association with FIGS. 2, 3, 4, and/or 5). For example, the computing device 805 can perform one or more of the functions of the method shown in FIG. 3. As another example, the computing device 805 can perform one or more of the functions of the method shown in FIG. 5. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations. Furthermore, as previously noted, the functionality of the computing device discussed in the previously described embodiments may be executed by one or more of the hardware and/or software components illustrated in FIG. 8.

The computing device 805 is shown comprising hardware elements that can be electrically coupled via a bus 805 (or may otherwise be in communication, as appropriate). The hardware elements may include a processing unit(s) 810 which can include without limitation one or more general-purpose processors, one or more special-purpose processors (such as digital signal processor (DSP) chips, graphics acceleration processors, application specific integrated circuits (ASICs), and/or the like), and/or other processing structures or means. As shown in FIG. 8, some embodiments may have a separate DSP 820, depending on desired functionality. Location determination and/or other determinations based on wireless communication may be provided in the processing unit(s) 810 and/or wireless communication interface 830 (discussed below). The computing device 805 also can include one or more input devices 870, which can include without limitation one or more keyboards, touch screens, touch pads, microphones, buttons, dials, switches, and/or the like; and one or more output devices 815, which can include without limitation one or more displays (e.g., touch screens), light emitting diodes (LEDs), speakers, and/or the like.

The computing device 805 may also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the computing device 805 to communicate with other devices as described in the embodiments above. The wireless communication interface 830 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 832 that send and/or receive wireless signals 834. According to some embodiments, the wireless communication antenna(s) 832 may comprise a plurality of discrete antennas, antenna arrays, or any combination thereof. The antenna(s) 832 may be capable of transmitting and receiving wireless signals using beams (e.g., Tx beams and Rx beams). Beam formation may be performed using digital and/or analog beam formation techniques, with respective digital and/or analog circuitry. The wireless communication interface 830 may include such circuitry.

Depending on desired functionality, the wireless communication interface 830 may comprise a separate receiver and transmitter, or any combination of transceivers, transmitters, and/or receivers to communicate with base stations (e.g., ng-eNBs and gNBs) and other terrestrial transceivers, such as wireless devices and access points. The computing device 805 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The computing device 805 can further include sensor(s) 840. Sensor(s) 840 may comprise, without limitation, one or more inertial sensors and/or other sensors (e.g., accelerometer(s), gyroscope(s), camera(s), radar device(s), lidar device(s), magnetometer(s), altimeter(s), microphone(s), proximity sensor(s), light sensor(s), barometer(s), and the like), some of which may be used to obtain position-related measurements and/or other information.

Embodiments of the computing device 805 may also include a Global Navigation Satellite System (GNSS) receiver 880 capable of receiving signals 884 from one or more GNSS satellites using an antenna 882 (which could be the same as antenna 832). Positioning based on GNSS signal measurement can be utilized to complement and/or incorporate the techniques described herein. The GNSS receiver 880 can extract a position of the computing device 805, using conventional techniques, from GNSS satellites 810 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 880 is illustrated in FIG. 8 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 810, DSP 820, and/or a processing unit within the wireless communication interface 830 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 810 or DSP 820.

The computing device 805 may further include and/or be in communication with a memory 860. The memory 860 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the computing device 805 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the computing device 805 (and/or processing unit(s) 810 or DSP 820 within computing device 805). In an aspect, then such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for processing image data, the method comprising: obtaining a radar point cloud and one or more frames of camera data; determining depth estimates of one or more pixels of the one or more frames of camera data; generating a pseudo lidar point cloud using the depth estimates of the one or more pixels of the one or more frames of camera data, wherein the pseudo lidar point cloud comprises a three-dimensional representation of at least one frame of the one or more frames of camera data; and determining one or more object bounding boxes based on the radar point cloud and the pseudo lidar point cloud.

Clause 2. The method of clause 1, further comprising combining the radar point cloud and the pseudo lidar point cloud, wherein the one or more object bounding boxes are identified based on the combination of the radar point cloud and the pseudo lidar point cloud.

Clause 3. The method of clause 2, wherein combining the radar point cloud and the pseudo lidar point cloud comprises using the radar point cloud to modify one or more values associated with the pseudo lidar point cloud.

Clause 4. The method of any of clauses 1-3, further comprising transforming the pseudo lidar point cloud to a two-dimensional representation of the pseudo lidar point cloud, wherein identifying the one or more object bounding boxes is based on the two-dimensional representation of the pseudo lidar point cloud, and wherein the one or more object bounding boxes are two-dimensional object bounding boxes.

Clause 5. The method of any of clauses 1-4, wherein determining the depth estimates of the one or more pixels of the one or more frames of camera data comprises using the one or more frames of camera data as an input to a trained machine learning model that predicts the depth estimates.

Clause 6. The method of clause 5, wherein the trained machine learning model is an encoder-decoder network.

Clause 7. The method of any of clauses 1-6, wherein the camera data is monocular camera data.

Clause 8. The method of any of clauses 1-7, further comprising: obtaining semantic segmentation information associated with at least one frame of the one or more frames of camera data, wherein the semantic segmentation information identifies at least one cluster of the one or more pixels included in the at least one frame of the one or more frames of camera data that are associated with a same object; applying the semantic segmentation information to the at least one frame of the one or more frames of camera data to generate segmented camera data; and applying the semantic segmentation information to the radar point cloud to obtain a segmented radar point cloud, wherein the one or more object bounding boxes are identified based on the segmented radar point cloud.

Clause 9. The method of clause 8, wherein applying the semantic segmentation information to the radar point cloud comprises: transforming the segmented camera data to a bird's eye view by performing inverse perspective mapping on the segmented camera data; and applying the semantic segmentation information from the bird's eye view to the radar point cloud to obtain the segmented radar point cloud.

Clause 10. The method of clause 8 or 9, wherein determining the depth estimates of the one or more pixels of the one or more frames of camera data comprises using the semantic segmentation information to determine the depth estimates, and wherein applying the semantic segmentation information to the radar point cloud is based on the depth estimates that incorporate the semantic segmentation information.

Clause 11. The method of clause 10, wherein using the semantic segmentation information to determine the depth estimates comprises providing the semantic segmentation information to a trained machine learning model that predicts the depth estimates.

Clause 12. The method of clause 11, wherein the trained machine learning model is an encoder-decoder network, and wherein providing the semantic segmentation information to the trained machine learning model comprises providing at least a portion of the semantic segmentation information to at least one deconvolution layer of the encoder-decoder network.

Clause 13. A device for processing image data, the method comprising: a transceiver; a memory; and one or more processing units communicatively coupled with the transceiver and the memory, the one or more processing units configured to: obtain a radar point cloud and one or more frames of camera data; determine depth estimates of one or more pixels of the one or more frames of camera data; generate a pseudo lidar point cloud using the depth estimates of the one or more pixels of the one or more frames of camera data, wherein the pseudo lidar point cloud comprises a three-dimensional representation of at least one frame of the one or more frames of camera data; and determine one or more object bounding boxes based on the radar point cloud and the pseudo lidar point cloud.

Clause 14. The device of clause 13, wherein the one or more processing units are further configured to combine the radar point cloud and the pseudo lidar point cloud, wherein the one or more object bounding boxes are identified based on the combination of the radar point cloud and the pseudo lidar point cloud.

Clause 15. The device of clause 14, wherein to combine the radar point cloud and the pseudo lidar point cloud the one or more processing units are further configured to use the radar point cloud to modify one or more values associated with the pseudo lidar point cloud.

Clause 16. The device of any of clauses 13-15, wherein the one or more processing units are further configured to transform the pseudo lidar point cloud to a two-dimensional representation of the pseudo lidar point cloud, identifying the one or more object bounding boxes is based on the two-dimensional representation of the pseudo lidar point cloud, and wherein the one or more object bounding boxes are two-dimensional object bounding boxes.

Clause 17. The device of any of clauses 13-16, wherein to determine the depth estimates of the one or more pixels of the one or more frames of camera data, the one or more processing units are further configured to use the one or more frames of camera data as an input to a trained machine learning model that predicts the depth estimates.

Clause 18. The device of clause 17, wherein the trained machine learning model is an encoder-decoder network.

Clause 19. The device of any of clauses 13-18, wherein the camera data is monocular camera data.

Clause 20. The device of any of clauses 13-19, wherein the one or more processing units are further configured to: obtain semantic segmentation information associated with at least one frame of the one or more frames of camera data, wherein the semantic segmentation information identifies at least one cluster of the one or more pixels included in the at least one frame of the one or more frames of camera data that are associated with a same object; apply the semantic segmentation information to the at least one frame of the one or more frames of camera data to generate segmented camera data; and apply the semantic segmentation information to the radar point cloud to obtain a segmented radar point cloud, wherein the one or more object bounding boxes are identified based on the segmented radar point cloud.

Clause 21. The device clause 20, wherein to apply the semantic segmentation information to the radar point cloud, the one or more processing units are further configured to: transform the segmented camera data to a bird's eye view by performing inverse perspective mapping on the segmented camera data; and apply the semantic segmentation information from the bird's eye view to the radar point cloud to obtain the segmented radar point cloud.

Clause 22. The device of clause 20 or 21, wherein to determine the depth estimates of the one or more pixels of the one or more frames of camera data, the one or more processing units are further configured to use the semantic segmentation information to determine the depth estimates, and wherein applying the semantic segmentation information to the radar point cloud is based on the depth estimates that incorporate the semantic segmentation information.

Clause 23. The device of clause 22, wherein to use the semantic segmentation information to determine the depth estimates, the one or more processing units are further configured to provide the semantic segmentation information to a trained machine learning model that predicts the depth estimates.

Clause 24. The device of clause 23, wherein the trained machine learning model is an encoder-decoder network, and wherein to provide the semantic segmentation information to the trained machine learning model, the one or more processing units are further configured to provide at least a portion of the semantic segmentation information to at least one deconvolution layer of the encoder-decoder network.

Clause 25. A device for processing image data, the device comprising: means for obtaining a radar point cloud and one or more frames of camera data; means for determining depth estimates of one or more pixels of the one or more frames of camera data; means for generating a pseudo lidar point cloud using the depth estimates of the one or more pixels of the one or more frames of camera data, wherein the pseudo lidar point cloud comprises a three-dimensional representation of at least one frame of the one or more frames of camera data; and means for determining one or more object bounding boxes based on the radar point cloud and the pseudo lidar point cloud.

Clause 26. The device of clause 25, further comprising means for combining the radar point cloud and the pseudo lidar point cloud, wherein the one or more object bounding boxes are identified based on the combination of the radar point cloud and the pseudo lidar point cloud.

Clause 27. The device of clause 26, wherein the means for combining the radar point cloud and the pseudo lidar point cloud comprises means for using the radar point cloud to modify one or more values associated with the pseudo lidar point cloud.

Clause 28. The device of any of clauses 25-27, further comprising means for transforming the pseudo lidar point cloud to a two-dimensional representation of the pseudo lidar point cloud, wherein identifying the one or more object bounding boxes is based on the two-dimensional representation of the pseudo lidar point cloud, and wherein the one or more object bounding boxes are two-dimensional object bounding boxes.

Clause 29. The device of any of clauses 25-28, wherein the means for determining the depth estimates of the one or more pixels of the one or more frames of camera data comprises means for using the one or more frames of camera data as an input to a trained machine learning model that predicts the depth estimates.

Clause 30. The device of clause 29, wherein the trained machine learning model is an encoder-decoder network.

Clause 31. The device of any of clauses 25-30, wherein the camera data is monocular camera data.

Clause 32. The device of any of clauses 25-31, further comprising: means for obtaining semantic segmentation information associated with at least one frame of the one or more frames of camera data, wherein the semantic segmentation information identifies at least one cluster of the one or more pixels included in the at least one frame of the one or more frames of camera data that are associated with a same object; means for applying the semantic segmentation information to the at least one frame of the one or more frames of camera data to generate segmented camera data; and means for applying the semantic segmentation information to the radar point cloud to obtain a segmented radar point cloud, wherein the one or more object bounding boxes are identified based on the segmented radar point cloud.

Clause 33. The device of clause 32, wherein the means for applying the semantic segmentation information to the radar point cloud comprises: means for transforming the segmented camera data to a bird's eye view by performing inverse perspective mapping on the segmented camera data; and means for applying the semantic segmentation information from the bird's eye view to the radar point cloud to obtain the segmented radar point cloud.

Clause 34. The device of clause 32 or 33, wherein the means for determining the depth estimates of the one or more pixels of the one or more frames of camera data comprises means for using the semantic segmentation information to determine the depth estimates, and wherein applying the semantic segmentation information to the radar point cloud is based on the depth estimates that incorporate the semantic segmentation information.

Clause 35. The device of clause 34, wherein the means for using the semantic segmentation information to determine the depth estimates comprises means for providing the semantic segmentation information to a trained machine learning model that predicts the depth estimates.

Clause 36. The device of clause 35, wherein the trained machine learning model is an encoder-decoder network, and wherein the means for providing the semantic segmentation information to the trained machine learning model comprises means for providing at least a portion of the semantic segmentation information to at least one deconvolution layer of the encoder-decoder network.

Clause 37. A non-transitory computer-readable medium storing instructions for processing image data, the instructions comprising code for: obtaining a radar point cloud and one or more frames of camera data; determining depth estimates of one or more pixels of the one or more frames of camera data; generating a pseudo lidar point cloud using the depth estimates of the one or more pixels of the one or more frames of camera data, wherein the pseudo lidar point cloud comprises a three-dimensional representation of at least one frame of the one or more frames of camera data; and determining one or more object bounding boxes based on the radar point cloud and the pseudo lidar point cloud.

Clause 38. The non-transitory computer-readable medium of clause 37, the instructions further comprising code for combining the radar point cloud and the pseudo lidar point cloud, wherein the one or more object bounding boxes are identified based on the combination of the radar point cloud and the pseudo lidar point cloud.

Clause 39. The non-transitory computer-readable medium of clause 38, wherein combining the radar point cloud and the pseudo lidar point cloud comprises using the radar point cloud to modify one or more values associated with the pseudo lidar point cloud.

Clause 40. The non-transitory computer-readable medium of any of clauses 37-39, the instructions further comprising code for transforming the pseudo lidar point cloud to a two-dimensional representation of the pseudo lidar point cloud, wherein identifying the one or more object bounding boxes is based on the two-dimensional representation of the pseudo lidar point cloud, and wherein the one or more object bounding boxes are two-dimensional object bounding boxes.

Clause 41. The non-transitory computer-readable medium of any of clauses 37-40, wherein determining the depth estimates of the one or more pixels of the one or more frames of camera data comprises using the one or more frames of camera data as an input to a trained machine learning model that predicts the depth estimates.

Clause 42. The non-transitory computer-readable medium of clause 41, wherein the trained machine learning model is an encoder-decoder network.

Clause 43. The non-transitory computer-readable medium of any of clauses 37-42, wherein the camera data is monocular camera data.

Clause 44. The non-transitory computer-readable medium of any of clauses 37-43, the instructions further comprising code for: obtaining semantic segmentation information associated with at least one frame of the one or more frames of camera data, wherein the semantic segmentation information identifies at least one cluster of the one or more pixels included in the at least one frame of the one or more frames of camera data that are associated with a same object; applying the semantic segmentation information to the at least one frame of the one or more frames of camera data to generate segmented camera data; and applying the semantic segmentation information to the radar point cloud to obtain a segmented radar point cloud, wherein the one or more object bounding boxes are identified based on the segmented radar point cloud.

Clause 45. The non-transitory computer-readable medium of clause 44, wherein applying the semantic segmentation information to the radar point cloud comprises: transforming the segmented camera data to a bird's eye view by performing inverse perspective mapping on the segmented camera data; and applying the semantic segmentation information from the bird's eye view to the radar point cloud to obtain the segmented radar point cloud.

Clause 46. The non-transitory computer-readable medium of clause 44 or 45, wherein determining the depth estimates of the one or more pixels of the one or more frames of camera data comprises using the semantic segmentation information to determine the depth estimates, and wherein applying the semantic segmentation information to the radar point cloud is based on the depth estimates that incorporate the semantic segmentation information.

Clause 47. The non-transitory computer-readable medium of clause 46, wherein using the semantic segmentation information to determine the depth estimates comprises providing the semantic segmentation information to a trained machine learning model that predicts the depth estimates.

Clause 48. The non-transitory computer-readable medium of clause 47, wherein the trained machine learning model is an encoder-decoder network, and wherein providing the semantic segmentation information to the trained machine learning model comprises providing at least a portion of the semantic segmentation information to at least one deconvolution layer of the encoder-decoder network.

What is claimed is:

1. A method for processing image data, the method comprising:

obtaining a radar point cloud and one or more frames of camera data;
determining depth estimates of one or more pixels of the one or more frames of camera data;
generating a pseudo lidar point cloud using the depth estimates of the one or more pixels of the one or more frames of camera data, wherein the pseudo lidar point cloud comprises a three-dimensional representation of at least one frame of the one or more frames of camera data, and wherein generating the pseudo lidar point cloud comprises transforming the one or more frames of the camera data from camera coordinates to world coordinates; and
determining one or more object bounding boxes based on the radar point cloud and the pseudo lidar point cloud.

2. The method of claim 1, further comprising combining the radar point cloud and the pseudo lidar point cloud, wherein the one or more object bounding boxes are identified based on the combination of the radar point cloud and the pseudo lidar point cloud.

3. The method of claim 2, wherein combining the radar point cloud and the pseudo lidar point cloud comprises using the radar point cloud to modify one or more values associated with the pseudo lidar point cloud.

4. The method of claim 1, further comprising transforming the pseudo lidar point cloud to a two-dimensional representation of the pseudo lidar point cloud, wherein identifying the one or more object bounding boxes is based on the two-dimensional representation of the pseudo lidar point cloud, and wherein the one or more object bounding boxes are two-dimensional object bounding boxes.

5. The method of claim 1, wherein determining the depth estimates of the one or more pixels of the one or more frames of camera data comprises using the one or more frames of camera data as an input to a trained machine learning model that predicts the depth estimates.

6. The method of claim 5, wherein the trained machine learning model is an encoder-decoder network.

7. The method of claim 1, wherein the camera data is monocular camera data.

8. The method of claim 1, further comprising:
obtaining semantic segmentation information associated with at least one frame of the one or more frames of camera data, wherein the semantic segmentation information identifies at least one cluster of the one or more pixels included in the at least one frame of the one or more frames of camera data that are associated with a same object;
applying the semantic segmentation information to the at least one frame of the one or more frames of camera data to generate segmented camera data; and
applying the semantic segmentation information to the radar point cloud to obtain a segmented radar point cloud, wherein the one or more object bounding boxes are identified based on the segmented radar point cloud.

9. The method of claim 8, wherein applying the semantic segmentation information to the radar point cloud comprises:
transforming the segmented camera data to a bird's eye view by performing inverse perspective mapping on the segmented camera data; and
applying the semantic segmentation information from the bird's eye view to the radar point cloud to obtain the segmented radar point cloud.

10. The method of claim 8, wherein determining the depth estimates of the one or more pixels of the one or more frames of camera data comprises using the semantic segmentation information to determine the depth estimates, and wherein applying the semantic segmentation information to the radar point cloud is based on the depth estimates that incorporate the semantic segmentation information.

11. The method of claim 10, wherein using the semantic segmentation information to determine the depth estimates comprises providing the semantic segmentation information to a trained machine learning model that predicts the depth estimates.

12. The method of claim 11, wherein the trained machine learning model is an encoder-decoder network, and wherein providing the semantic segmentation information to the trained machine learning model comprises providing at least a portion of the semantic segmentation information to at least one deconvolution layer of the encoder-decoder network.

13. A device for processing image data, the device comprising:
a transceiver;
a memory; and
one or more processing units communicatively coupled with the transceiver and the memory, the one or more processing units configured to:
obtain a radar point cloud and one or more frames of camera data;
determine depth estimates of one or more pixels of the one or more frames of camera data;
generate a pseudo lidar point cloud using the depth estimates of the one or more pixels of the one or more frames of camera data, wherein the pseudo lidar point cloud comprises a three-dimensional representation of at least one frame of the one or more frames of camera data, and wherein to generate the pseudo lidar point cloud, the one or more processing units are configured to transform the one or more frames of the camera data from camera coordinates to world coordinates; and
determine one or more object bounding boxes based on the radar point cloud and the pseudo lidar point cloud.

14. The device of claim 13, wherein the one or more processing units are further configured to combine the radar point cloud and the pseudo lidar point cloud, wherein the one or more object bounding boxes are identified based on the combination of the radar point cloud and the pseudo lidar point cloud.

15. The device of claim 14, wherein to combine the radar point cloud and the pseudo lidar point cloud the one or more processing units are further configured to use the radar point cloud to modify one or more values associated with the pseudo lidar point cloud.

16. The device of claim 13, wherein the one or more processing units are further configured to transform the pseudo lidar point cloud to a two-dimensional representation of the pseudo lidar point cloud, identifying the one or more object bounding boxes is based on the two-dimensional representation of the pseudo lidar point cloud, and wherein the one or more object bounding boxes are two-dimensional object bounding boxes.

17. The device of claim 13, wherein to determine the depth estimates of the one or more pixels of the one or more frames of camera data, the one or more processing units are further configured to use the one or more frames of camera data as an input to a trained machine learning model that predicts the depth estimates.

18. The device of claim 17, wherein the trained machine learning model is an encoder-decoder network.

19. The device of claim 13, wherein the camera data is monocular camera data.

20. The device of claim 13, wherein the one or more processing units are further configured to:
obtain semantic segmentation information associated with at least one frame of the one or more frames of camera data, wherein the semantic segmentation information identifies at least one cluster of the one or more pixels included in the at least one frame of the one or more frames of camera data that are associated with a same object;
apply the semantic segmentation information to the at least one frame of the one or more frames of camera data to generate segmented camera data; and
apply the semantic segmentation information to the radar point cloud to obtain a segmented radar point cloud, wherein the one or more object bounding boxes are identified based on the segmented radar point cloud.

21. The device of claim 20, wherein to apply the semantic segmentation information to the radar point cloud, the one or more processing units are further configured to:
transform the segmented camera data to a bird's eye view by performing inverse perspective mapping on the segmented camera data; and
apply the semantic segmentation information from the bird's eye view to the radar point cloud to obtain the segmented radar point cloud.

22. The device of claim 20, wherein to determine the depth estimates of the one or more pixels of the one or more frames of camera data, the one or more processing units are further configured to use the semantic segmentation information to determine the depth estimates, and wherein applying the semantic segmentation information to the radar point cloud is based on the depth estimates that incorporate the semantic segmentation information.

23. The device of claim 22, wherein to use the semantic segmentation information to determine the depth estimates, the one or more processing units are further configured to provide the semantic segmentation information to a trained machine learning model that predicts the depth estimates.

24. The device of claim 23, wherein the trained machine learning model is an encoder-decoder network, and wherein to provide the semantic segmentation information to the trained machine learning model, the one or more processing units are further configured to provide at least a portion of the semantic segmentation information to at least one deconvolution layer of the encoder-decoder network.

25. A device for processing image data, the device comprising:
means for obtaining a radar point cloud and one or more frames of camera data;
means for determining depth estimates of one or more pixels of the one or more frames of camera data;
means for generating a pseudo lidar point cloud using the depth estimates of the one or more pixels of the one or more frames of camera data, wherein the pseudo lidar point cloud comprises a three-dimensional representation of at least one frame of the one or more frames of camera data, and wherein generating the pseudo lidar point cloud comprises transforming the one or more frames of the camera data from camera coordinates to world coordinates; and
means for determining one or more object bounding boxes based on the radar point cloud and the pseudo lidar point cloud.

26. The device of claim 25, further comprising means for combining the radar point cloud and the pseudo lidar point cloud, wherein the one or more object bounding boxes are identified based on the combination of the radar point cloud and the pseudo lidar point cloud.

27. The device of claim 25, further comprising means for transforming the pseudo lidar point cloud to a two-dimensional representation of the pseudo lidar point cloud, wherein identifying the one or more object bounding boxes is based on the two-dimensional representation of the pseudo lidar point cloud, and wherein the one or more object bounding boxes are two-dimensional object bounding boxes.

28. The device of claim 25, further comprising:
means for obtaining semantic segmentation information associated with at least one frame of the one or more frames of camera data, wherein the semantic segmentation information identifies at least one cluster of the one or more pixels included in the at least one frame of the one or more frames of camera data that are associated with a same object;
means for applying the semantic segmentation information to the at least one frame of the one or more frames of camera data to generate segmented camera data; and
means for applying the semantic segmentation information to the radar point cloud to obtain a segmented radar point cloud, wherein the one or more object bounding boxes are identified based on the segmented radar point cloud.

29. The device of claim 28, wherein the means for determining the depth estimates of the one or more pixels of the one or more frames of camera data comprises means for using the semantic segmentation information to determine the depth estimates, and wherein applying the semantic segmentation information to the radar point cloud is based on the depth estimates that incorporate the semantic segmentation information.

30. A non-transitory computer-readable medium storing instructions for processing image data, the instructions comprising code for:
obtaining a radar point cloud and one or more frames of camera data;
determining depth estimates of one or more pixels of the one or more frames of camera data;
generating a pseudo lidar point cloud using the depth estimates of the one or more pixels of the one or more frames of camera data, wherein the pseudo lidar point cloud comprises a three-dimensional representation of at least one frame of the one or more frames of camera data, and wherein generating the pseudo lidar point cloud comprises transforming the one or more frames of the camera data from camera coordinates to world coordinates; and
determining one or more object bounding boxes based on the radar point cloud and the pseudo lidar point cloud.

31. The non-transitory computer-readable medium of claim 30, the instructions further comprising code for combining the radar point cloud and the pseudo lidar point cloud, wherein the one or more object bounding boxes are identified based on the combination of the radar point cloud and the pseudo lidar point cloud.

32. The non-transitory computer-readable medium of claim 30, the instructions further comprising code for transforming the pseudo lidar point cloud to a two-dimensional representation of the pseudo lidar point cloud, wherein identifying the one or more object bounding boxes is based on the two-dimensional representation of the pseudo lidar point cloud, and wherein the one or more object bounding boxes are two-dimensional object bounding boxes.

33. The non-transitory computer-readable medium of claim 30, the instructions further comprising code for:
- obtaining semantic segmentation information associated with at least one frame of the one or more frames of camera data, wherein the semantic segmentation information identifies at least one cluster of the one or more pixels included in the at least one frame of the one or more frames of camera data that are associated with a same object;
- applying the semantic segmentation information to the at least one frame of the one or more frames of camera data to generate segmented camera data; and
- applying the semantic segmentation information to the radar point cloud to obtain a segmented radar point cloud, wherein the one or more object bounding boxes are identified based on the segmented radar point cloud.

34. The non-transitory computer-readable medium of claim 33, wherein determining the depth estimates of the one or more pixels of the one or more frames of camera data comprises using the semantic segmentation information to determine the depth estimates, and wherein applying the semantic segmentation information to the radar point cloud is based on the depth estimates that incorporate the semantic segmentation information.

35. The non-transitory computer-readable medium of claim 34, wherein using the semantic segmentation information to determine the depth estimates comprises providing the semantic segmentation information to a trained machine learning model that predicts the depth estimates.

36. The non-transitory computer-readable medium of claim 35, wherein the trained machine learning model is an encoder-decoder network, and wherein providing the semantic segmentation information to the trained machine learning model comprises providing at least a portion of the semantic segmentation information to at least one deconvolution layer of the encoder-decoder network.

* * * * *